(12) United States Patent
Orchard

(10) Patent No.: US 11,584,060 B2
(45) Date of Patent: Feb. 21, 2023

(54) METHOD TO PRODUCE PLASTIC CONTAINERS FROM AN ELONGATED HOLLOW PIECE, AND PLASTIC PRE-CONTAINER

(71) Applicant: COMPAGNIE GERVAIS DANONE, Paris (FR)

(72) Inventor: Alex James Orchard, Le Vesinet (FR)

(73) Assignee: COMPAGNIE GERVAIS DANONE, Paris (FR)

( * ) Notice: Subject to any disclaimer, the term of this patent is extended or adjusted under 35 U.S.C. 154(b) by 273 days.

(21) Appl. No.: 16/957,867

(22) PCT Filed: Dec. 29, 2017

(86) PCT No.: PCT/IB2017/001736
§ 371 (c)(1),
(2) Date: Jun. 25, 2020

(87) PCT Pub. No.: WO2019/130039
PCT Pub. Date: Jul. 4, 2019

(65) Prior Publication Data
US 2021/0053271 A1    Feb. 25, 2021

(51) Int. Cl.
*B29C 49/42* (2006.01)
*B65D 1/26* (2006.01)
(Continued)

(52) U.S. Cl.
CPC ........ *B29C 49/4273* (2013.01); *B29C 49/071* (2022.05); *B65D 1/26* (2013.01); *B29C 2793/0027* (2013.01); *B29L 2031/712* (2013.01)

(58) Field of Classification Search
CPC ..... B65D 1/26; B29C 49/071; B29C 49/4273; B29C 2793/009; B29C 2793/0027;
(Continued)

(56) References Cited

U.S. PATENT DOCUMENTS 3,310,620 A * 3/1967 Colinet ............... B29C 49/0021
425/441
3,432,586 A    3/1969 Stenger
(Continued)

FOREIGN PATENT DOCUMENTS

| CN | 103476499 A | 12/2013 |
| CN | 107214931 A | 9/2017 |
| EP | 0461947 A1 | 12/1991 |

OTHER PUBLICATIONS

International Search Report, dated Aug. 29, 2018, from corresponding PCT application No. PCT/IB2017/001736.
(Continued)

*Primary Examiner* — Monica A Huson
(74) *Attorney, Agent, or Firm* — Nixon & Vanderhye

(57) ABSTRACT

A thermoplastic pre-container, typically a blow molded piece, is provided to form several hollow bodies. The pre-container is elongated along a central axis and includes a bottom section, an opened section and in-between at least one hollow body section. A plurality of circumferential grooves are provided in a pre-container sidewall, each with a bottom line formed in a virtual plane perpendicular to the axis. The bodies are obtained after cutting the pre-container in a direction transverse to the central axis and severing the end sections. Due to the cutting at several of the circumferential grooves, a top opening and a base opening are respectively obtained for at least two hollow bodies, each opening being delimited by an annular inner rim of a body flange.

19 Claims, 15 Drawing Sheets

(51) Int. Cl.
*B29C 49/00* (2006.01)
*B29L 31/00* (2006.01)

(58) Field of Classification Search
CPC ... B29C 49/20; B29C 2791/001; B29C 49/06; B29C 49/4278; B29L 2031/712; B29L 2031/716
See application file for complete search history.

(56) References Cited

U.S. PATENT DOCUMENTS

| | | |
|---|---|---|
| 5,071,029 A | 12/1991 | Umlah et al. |
| 6,763,752 B2 | 7/2004 | Marshall et al. |
| 6,952,988 B2 | 10/2005 | Darr |
| 2004/0211746 A1 | 10/2004 | Trude |
| 2005/0066782 A1 | 3/2005 | Darr |
| 2006/0237095 A1 | 10/2006 | Johns et al. |
| 2013/0312372 A1 | 11/2013 | Rødtness et al. |
| 2017/0021552 A1 | 1/2017 | Dygert |

OTHER PUBLICATIONS

Written Opinion, dated Aug. 29, 2018, from corresponding PCT application No. PCT/IB2017/001736.
Office Action issued in Chinese Patent Application No. 201780098275.5 dated Oct. 26, 2021.

\* cited by examiner

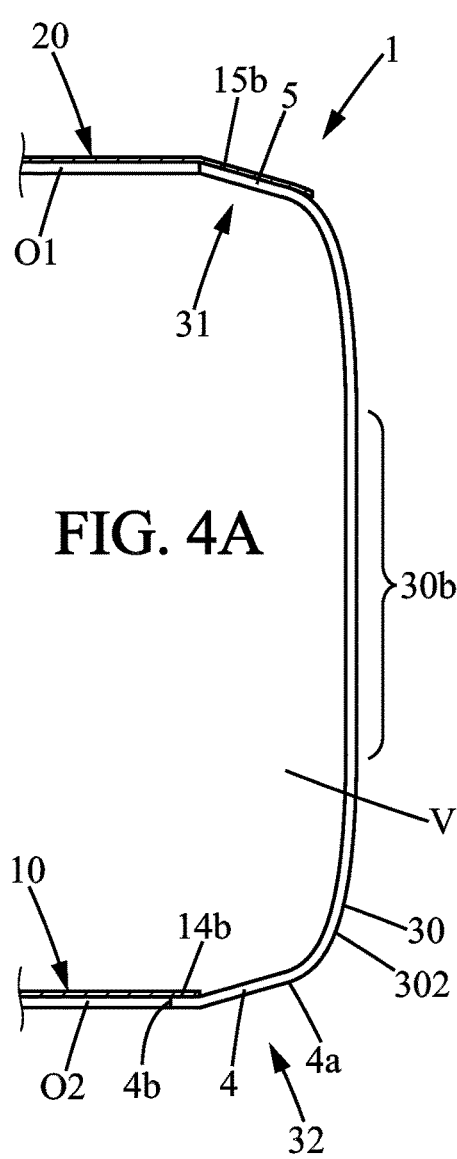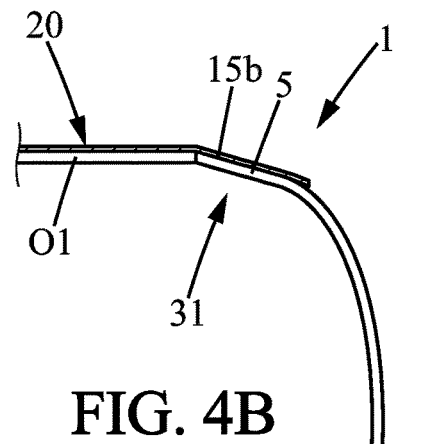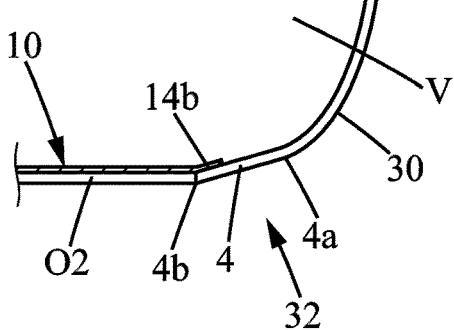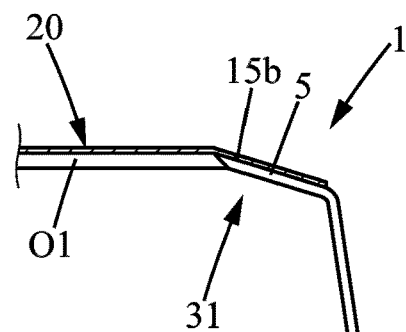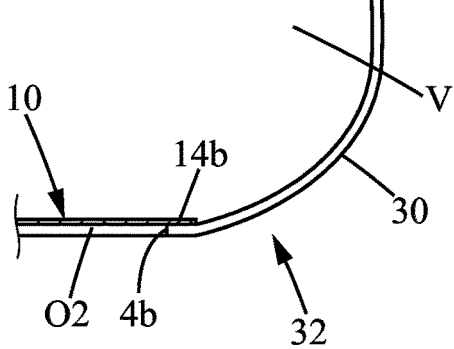

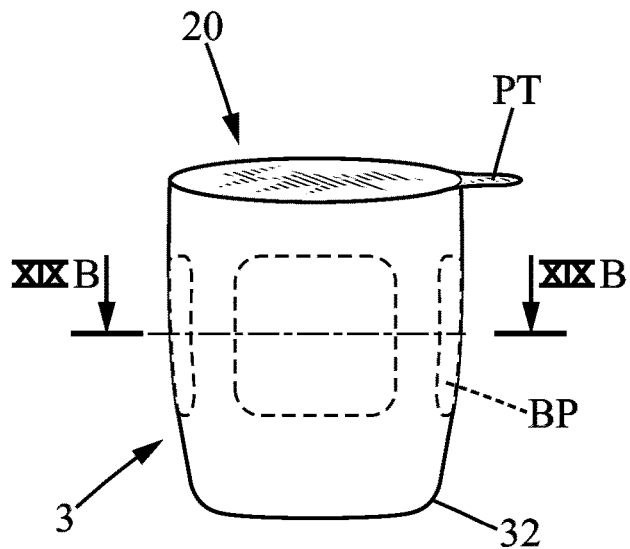
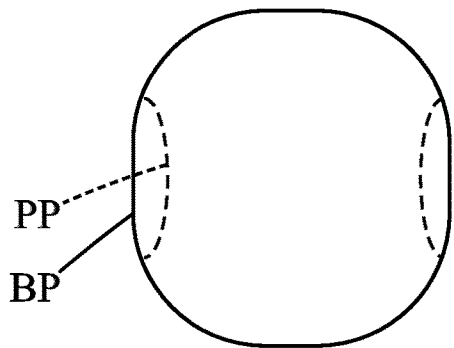
FIG. 19A
FIG. 19B
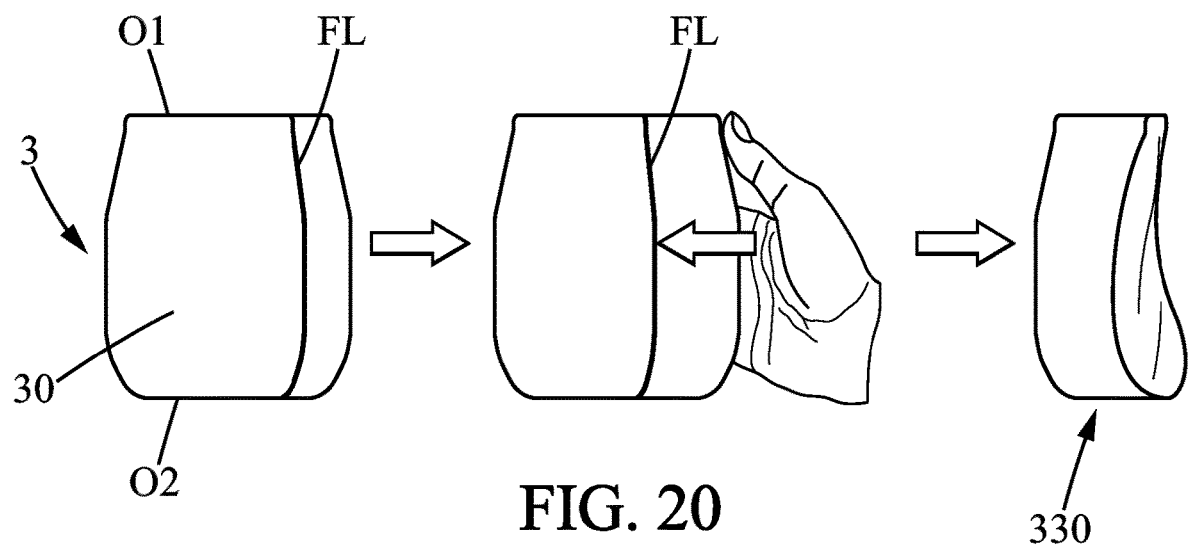
FIG. 20

METHOD TO PRODUCE PLASTIC CONTAINERS FROM AN ELONGATED HOLLOW PIECE, AND PLASTIC PRE-CONTAINER

FIELD OF THE INVENTION

The present invention generally relates to containers used in packaging industry, particularly to plastic containers having an opening for retrieving content of the container. The invention concerns a method of producing such containers and a pre-container.

BACKGROUND OF THE INVENTION

Containers with a body and an access opening at the top of the body, generally provided with a cover member to seal the access opening, are produced in very large quantities. The annular base generally defines a bearing surface suitable to maintain the container in an upstanding position, parallel to the longitudinal axis. Such containers have a substantially flat bottom portion.

For purpose of mass production, containers may be obtained by thermoforming from a plastic sheet in a mold. The containers are formed simultaneously and their outer rims (at an outer flange) remain joined together. Such method makes it possible to produce particularly inexpensive packaging containers, while at the same time adhering to the hygiene standards necessary for food products. The technology FFS (Form, Fill and Seal) is typically used to produce at high rate conventional containers grouped in packs and each sealed conventionally by a flexible closure lid (membrane). Such containers are also of light weight as compared to glass containers.

A drawback of such containers is that the flange is a thicker not stretched part and thus represents a significant amount of plastic material representing a cost and/or decreased sustainability footprint (more plastic used, more transportation needed for example). Additionally, the flange provides a visual aspect that some consumer would appreciate being different. Another drawback is that the bottom is also a thicker, moderately stretched part, representing as well a significant amount of material with a cost and/or decreased sustainability footprint.

Some containers, typically having a wide opening, may also be provided with a rigid lid, for instance fixed onto a thread or similar fixing part of the container. Such containers are expensive. Document U.S. Pat. No. 6,952,988 discloses a trimming method to obtain such kind of containers having a threaded finish. Due to economic considerations, such wide mouth blow molded containers are manufactured by employing standard small mouth preforms (that are inexpensive).

Other trimming methods, as disclosed in U.S. Pat. No. 6,763,752 for instance, are adapted to obtain a flanged container. A radially inwardly extending circumferential trim line groove is formed in the pre-container, separating a body portion and an opened dome portion. A trim scrap ring, arranged below the trim line groove, forms the desired outer flange that delimits a wide opening.

Containers having an outer flange that protrudes radially outwards provide a visual aspect that some consumer would appreciate being different.

Besides, containers having a side wall integrally formed with the bottom and sealed by a flexible top lid are often not collected by most municipal curbside collections for various reasons. In particular, it costs more money to recycle polypropylene than other plastics; so most utilities opt to skip recycling it altogether. And when dairy product containers are collected, they are melted down and mixed with other plastics to form "mixed plastics".

Another difficulty to achieve such recycling is the fact that a flexible cover member is often introduced in the interior volume of the body (after consumption or use of the content), which makes efficient sorting more complicated. The flexible cover member is often not in same plastic as the body: it is typically defined by a composite material and/or aluminium.

Accordingly, there is an interest for producing containers well adapted to be produced by efficient industrial processes, while being most suitable for recycling purposes.

SUMMARY OF THE INVENTION

The purpose of the present invention is to provide a method to produce containers addressing one or more of the above mentioned problems.

To this end, embodiments of the present invention provide a method to produce a plurality N of hollow bodies, N being a natural number greater than or equal to 2, the method comprising the following steps:

forming, by blowing plastic material, a pre-container (elongated pre-container) extending along a central axis, so as to define an opened pre-container section and a hollow body section (formed between a pre-container bottom section and the opened section) defining a pre-container sidewall that extends around the central axis, said sidewall being provided with a plurality of circumferential grooves each with a bottom line, in a sidewall of the pre-container, each bottom line being formed in a virtual plane perpendicular to the central axis, and cutting the pre-container to sever the opened pre-container section and a bottom section of the pre-container, the cutting being performed transversally to the central axis, at several of the respective circumferential grooves, to form a top opening and a base opening of N respective hollow bodies, each of the top opening and the base opening being delimited by an annular inner rim of a body flange.

With such way to form two opposite openings in the respective hollow bodies, the pre-container may be advantageously used to form two or more container bodies. A flexible lid may be used for sealing one amongst the top opening and the bottom opening, while a flexible lid or possibly another kind of covering element may seal the other opening.

The cutting is typically performed by one or more cutting means, which are engaged through the sidewall at a bottom region (bottom line) of one of the radially inwardly extending circumferential grooves, so that the base flange and the top flange are inwardly extending flanges.

According to a particular, the method comprises forming a base in at least one of the hollow bodies, by sealing a flexible lid (base lid) onto an annular face formed by a body flange (base flange) that surrounds the base opening.

Use of single pre-container and a plurality of sealing elements (for instance flexible lids of foil material) is of interest for mass production one the one hand, and for ease at recycling on the other hand. For each packaging container including the hollow body, an interior volume of the container may be axially closed at opposite ends, and then easily open, the top lid and the base lid being removable in order to open the opposite ends.

With such container having opposite openings and typically a specific sealing flexible base lid to define all or a main part of the bottom portion, the plastic hollow body is easier to recycle. When made from PET, such body may be recycled exactly as a conventional PET bottle. Such easy separation of the tubular hollow body prevents rejection in recycling streams. When removing the flexible lids, no lid or sealing element can be retained/caught in the interior volume.

Preferably, the top opening and the base opening formed at the respective flanges of the hollow bodies each are a wide opening.

Throughout the description and claims of this specification, the wording "wide opening" means that the opening has a diameter (if the opening is circular) or smaller size (if the opening is not circular) at least greater than half the inner diameter or similar radial size measured at a narrowest section of the side wall of the body. Optionally, such diameter or smaller size of the opening is at least greater than three quarters of the inner diameter or similar radial size of the side wall (i.e. with a length ratio of at least ¾ between such sizes). Preferably, the wide opening has diameter or equivalent characteristic size superior or equal to half the diameter or similar radial size measured at a maximum of section of the side wall of the body. Of course, the wide base opening is defined by a main opening of the container surrounded by the annular base, such wide base opening typically being the single opening at the base of the body.

Each hollow body can be prepared by the blow-trim process, for example an injection blow molding plus blow-trim process or an extrusion blow molding plus blow-trim process. In a particular embodiment, the method for obtaining the hollow bodies comprises the following steps:
  forming the pre-container, the opened pre-container section being joined to the remainder of the pre-container at a peripheral intersection line formed by at least one circumferential groove,
  cutting at the at least one circumferential groove the opened pre-container section in a direction transverse to the central axis to form a top opening of the hollow body,
  cutting similarly the bottom section,
  cutting similarly at each intermediate groove of the pre-container sidewall,
  preferably recycling the opened pre-container section and/or the bottom section in the stream of plastic material.

Optionally, the pre-container provided with an opening, for example a narrow opening, is a blow molded piece made of a thermoplastic material, e.g. made of polyethylene terephthalate (PET), polyethylene (PE), polypropylene (PP), polystyrene (PS), polylactic acid (PLA), or polyethylene furanoate (PEF), preferably a transparent PET material.

According to a particular, the pre-container is formed by blow molding a single piece hollow preform of plastic material, preferably of PET.

Optionally, each hollow body is deprived from any peripheral groove.

According to a particular, the bottom line that is adapted to form (after a cut) at least one of the two openings of a hollow body has a diameter or a maximal radial size that is superior to 30 mm and inferior or equal to 100 mm, whereby the hollow body obtained after a trimming of adjacent parts of the pre-container comprises an opening having a diameter or a maximal radial size that is superior to 30 mm and inferior or equal to 100 mm. Such provision may apply for each of the two openings. This arrangement facilitates removal from the flexible base lid (typically after consumption of a content stored inside the body) by an automatic process performed during recycling operations, as the flexible base lid may be easily detached, for example by a push member introduced through the top opening of the hollow body. Of course, the flexible top lid is also easily removable as it is easily peelable and typically provided with a pull tab.

In various embodiments of the method of the invention, recourse may optionally also be had to one or more of the following dispositions:
  N is equal to 2, 3, 4 or 5. In other words, 2, 3, 4, or 5 hollow bodies are obtained from the pre-container.
  the interior volume is filled with a content, for example a food content, after sealing one opening of a hollow body.
  the pre-container is cut to define a plurality of hollow bodies each of identical height, preferably of identical size and shape.
  the cutting step comprises forming an angled area in the flange surrounding at least one of the base opening and the top opening (the angled area being at annular junction between a (not cut) first flat portion and a (cut) second flat portion of the flange. The second flat portion may be substantially perpendicular to a longitudinal axis of the hollow body and includes a flange inner edge.
  each opening is closed by a sealing membrane or similar flexible lid, so that the annular side wall of the hollow body delimits a single interior volume of the hollow body (suitable for receiving a product), a sealing membrane being engaged against the base flange so as to be in annular sealing contact with the lower flange.
  one or more cutting elements are moved around the pre-container, optionally without disengaging the one or more cutting elements from the sidewall,
  the elongated pre-container is rotated around the central axis while maintaining the one or more cutting elements stationary in an engaged configuration with respect to the sidewall.
  the pre-container is heated and shaped in a mold device that comprise inner ribs, so as to form the plurality of circumferential grooves.
  the cutting of the pre-container is performed so as to form at least two hollow bodies of same height, due to a same spacing between respective pairs of the circumferential grooves.
  the cutting of the pre-container is performed by simultaneously cutting the opened pre-container section and the bottom section.
  the cutting of the pre-container is performed by sequentially cutting the opened pre-container section and the bottom section.
  the cutting of the pre-container comprises cutting at one of the circumferential grooves to separate two adjacent hollow bodies having an opening identical in size and shape.
  two hollow bodies are separated from each other in the pre-container by a transitory section, wherein the cutting of the pre-container comprises cutting at two of the circumferential grooves that correspond to two opposite axial ends of the transitory section.
  the transitory section is at least twice shorter, as measured along the central axis, than any one of the N hollow bodies, and preferably has a height no longer than 25 mm when each of the hollow bodies has a height greater than 40 mm.

the method comprises sealing a flexible lid made of foil material onto at least one of the two flanges delimiting the base opening and the top opening, respectively.

at least one section amongst the bottom section, the opened section and the one or more transitory sections is collected, for instance by a collecting unit associated to the cutting means, for recycling plastic material.

The invention also concerns a pre-container suitable to form several hollow bodies having each opposite openings, in industrial manner.

Embodiments of the invention provide an elongated blow-molded pre-container made of a single piece of plastic, intended to produce a plurality N of hollow bodies, N being a natural number greater than or equal to 2, the pre-container comprising:

a first end provided with an opening, for example a narrow opening;

a second end provided with a bottom section, at the opposite from the first end;

a multi-cell elongated body comprising the bottom section and a sidewall of tubular shape that longitudinally extends between the bottom section and the first end, around a central axis;

wherein the sidewall of the multi-cell body comprises a determined number equal to at least N+1 of circumferential grooves each provided with a bottom line defined in a virtual plane perpendicular to the central axis, so that the sidewall is provided with said determined number of bottom lines;

wherein N−1 of the bottom lines form each an intersection line between:

a first annular part tapering toward the first end, and a second annular part tapering toward the second end, so that the first annular part and the second annular part define a V-shape longitudinal profile in the sidewall, the V-shape being defined with a determined apex angle, which is comprised between 10 and 40°, preferably between 20 and 40° as measured in any longitudinal plane parallel to the central axis, and wherein the sidewall forms a plurality of hollow bodies each having a body side wall extending between two determined grooves of the circumferential grooves, each bottom line of the two determined grooves being adapted to delimit a body opening when cut perpendicular to the central axis, whereby each body opening is delimited by an annular inner rim of a body flange.

Advantageously, each hollow body can be of lighter weight as compared to a side wall of a deep-drawn plastic packaging cup. Each hollow body may be obtained with lower cost related to the plastic material in the one hand, and with lower environmental footprint on the other end. Flexible lids, typically of foil material, may be used to seal the openings.

Each of the two flanges (inner flanges) of any one of the hollow bodies may be provided with a thickness inferior or equal to 1.0 mm or inferior to 1.2 mm.

Maximal thickness in the upper portion of side wall (of any one of the hollow bodies) is optionally lower than 300 or 450 µm. Preferably for having a final container having a thin wall (typically with a body of less than 5 or 7 g), maximal thickness in the whole side wall is lower than 300 or 450 µm.

The hollow body has a capacity between 50 ml to 1000 ml, preferably 75 ml to 250 ml, and may be used to store an amount of food composition representing at least 50 g and up to 1000 g, preferably between 75 g and 250 g of a food composition, preferably wet food composition, for example a dairy composition.

Besides, in food industry as in other fields, plastic containers can often be stacked on top of one another so as to form stacks which can be layered on a pallet. When having a hollow body without an outer flange protruding outwardly as compared to the annular side wall of the body, a pallet may contain more containers as interspace between the individual containers may be reduced.

According to a particular, each body flange formed by the pre-container is disc-shaped.

According to a particular, after sealing (preferably thermosealing), the top flange is slightly tapering upwardly, so that a shallow angle is defined between a horizontal plane perpendicular to the longitudinal axis and an upper face of the top flange; such angle is typically inferior or equal to 7 or 9°, preferably strictly inferior to 6°, so that height of the top flange 5 is minimized (and reduced as compared to height of the top flange before the sealing).

Herein the term "vertical" can refer to the direction of the longitudinal axis (or central axis of the pre-container). The term "horizontal" can refer to the plane perpendicular to the "vertical".

According to a particular, the two determined grooves used to form a body opening form:

a first bottom line radially offset, inwardly by a radial distance superior or equal to 2.0 mm, from a first axial annular end of the body side wall;

a second bottom line radially offset, inwardly by a radial distance superior or equal to 2.0 mm, from a second axial annular end of the body side wall at the opposite form the first axial annular end.

Optionally, a sealing method may be part of a process for producing at least one container, such process comprising:

sealing the base opening and thus obtaining a body having a bottom and a side wall to delimit an interior volume;

filling the interior volume with a content, preferably a food composition, preferably a wet food dairy composition, through the top opening delimited by a top flange that protrudes radially inward from an annular top of the side wall;

thermosealing the flexible top lid onto an upper face of the top flange in an annular contact area continuously surrounding the opening.

Typically, the flexible top lid is sized and shaped so that only one optional pull tab of the lid, which is preferably not adhered to the body, radially protrudes outward to be laterally shifted relative to the annular top of the side wall.

The position of the flexible top lid is preferably adjusted with respect to an outer rim of the top flange during the sealing, so that an annular outer edge of the flexible lid, except when delimiting an optional the pull tab:

does not extend radially beyond the outer rim of the top flange, or extends radially at most 2.0 mm, preferably at most 1.0 mm, beyond the outer rim of the top flange.

Optionally, the determined number of circumferential grooves is equal to N+1.

According to another option, the determined number of circumferential grooves is at least equal to 2N. More generally, having two grooves between two hollow bodies to be trimmed may be of interest to easily engage a cutting element in the corresponding grove. Indeed, there is more flexibility for the design of the grooves, and risk of altering the body flange when cutting may be reduced.

According to a particular, each of the bottom lines has a circular section and is of greater size than the narrow opening of the pre-container.

In various embodiments of the pre-container of the invention, recourse may optionally also be had to one or more of the following dispositions:

- two successive grooves circumferential grooves are longitudinally spaced from a distance of at least 40 or 50 mm.
- the pre-container is adapted to form hollow bodies each deprived from any outer collar or outer flange.
- the sidewall of the pre-container, forms more than 75% or more than 85% of total height of the pre-container.
- the sidewall of the pre-container includes circular and non-circular cross sections.
- the sidewall of the pre-container is provided with a circular cross section, for example to define touch points during rotary trimming operation and/or handling in manufacturing and/or to define a display surface (either indirectly, by defining a contact surface to be covered by a decorative banderol, sticker or sleeve, or directly if the surface of the side wall is provided with direct marks).
- the sidewall is also provided with a is non-circular or non-symmetric cross section, which may be of interest, for example to stabilize product movement contained in the interior volume and, for a set fermented dairy composition, to prevent product degradation with formation of whey.
- the pre-container has a sidewall formed by a single layer of plastic material.
- the pre-container has a sidewall formed by at least two distinct layers.
- the plastic material of the pre-container is suitable for blow molding process, for instance for a stretching blow molding.
- examples of such plastics are PET, PET-G, HDPE, PP, PET-X, PP, HP, PVC, PEN, Copolymers of the aforementioned plastics, Bioplastics, as for example PLA or PEF, filled Plastics and Mixtures of the Plastics mentioned.
- each hollow body (preferably in PET) is formed with flanges, one of which (typically the top flange) having a radial extension superior or equal to 2.0 mm.
- each hollow body has a flange forming a top flange having a radial extension that is preferably superior or equal to 2.5 mm, and inferior or equal to 5.0 mm, measured between an annular inner rim and an annular outer rim adjacent to the annular top of the body side wall.
- maximal radial extension of the top flange as measured in the opening plane, between the outer rim and the inner rim, is less than 5.0 mm, preferably inferior or equal to 4.0 mm.

When using a sealing membrane or similar flexible lid, the upper face of the base lid has a surface in contact with a content, this surface being of at least 200 mm$^2$, typically more than 400 or 500 mm$^2$ (such arrangement makes the removal of the sealing membrane easier after consumption of the content, for example by a simple pushing action exerted by a user finger at the opposite from the upper face). Optionally, at least one of the flexible lids is thermosealed on the corresponding flange.

Regarding the flexible lid used to form the base lid or the top lid, it may:

- be made of flexible foil material;
- be made of a material more flexible than the plastic material of the hollow body;
- define a pull tab;
- be of circular shape except in a region where the pull tab extends;
- be of oval shape except in a region where the pull tab extends;
- be circular without any pull tab or oval without any pull tab;
- be formed by a single piece foil;
- be formed by a single layer of film or a multilayered film;
- be printed on an outer face thereof;
- be printed on an inner face thereof;
- be provided with a reinforcing film element defined by a film.

The optional reinforcing film element may have an outer offset inwardly as compared to an outer rim of the sealing annular area.

The optional reinforcing film element may define means for preventing rotation of a set fermented dairy composition extending in the interior volume (preventing formation of whey, which is especially of interest when the side wall has essentially a circular cross section).

Optionally, the flexible top lid has a thickness of from 20 to 50 μm preferably from 25 to 40 μm.

The flexible lid can comprise a central portion not in contact with the hollow body and a sealing annular area, extending around the central portion, which is in axial contact with one of the upper surface and lower surface of the base flange.

The flexible lid can be in axial contact with the base flange and also in contact with the annular side wall.

One lid or the two lids may entirely cover the annular face of the corresponding flange.

Other features and advantages of the invention will become apparent to those skilled in the art during the description which will follow, given by way of a non-limiting example, with reference to the appended drawings.

BRIEF DESCRIPTION OF THE DRAWINGS

FIG. 4A illustrates a longitudinal section view showing an exemplary profile of the body side wall;

FIG. 4B illustrates a longitudinal section view showing another exemplary profile of the body side wall;

FIG. 4C illustrates a longitudinal section view showing another exemplary profile of the body side wall;

FIG. 19A is a perspective view showing container provided with bistable panels;

FIG. 19B is a section view showing the side wall substantially in the middle of the container of FIG. 19A;

FIG. 20 schematically illustrates a way to crush a container when provided with one or more fragile lines.

DETAILED DESCRIPTION OF EMBODIMENTS

In the various figures, the same references are used to designate identical or similar elements.

Figure 1:
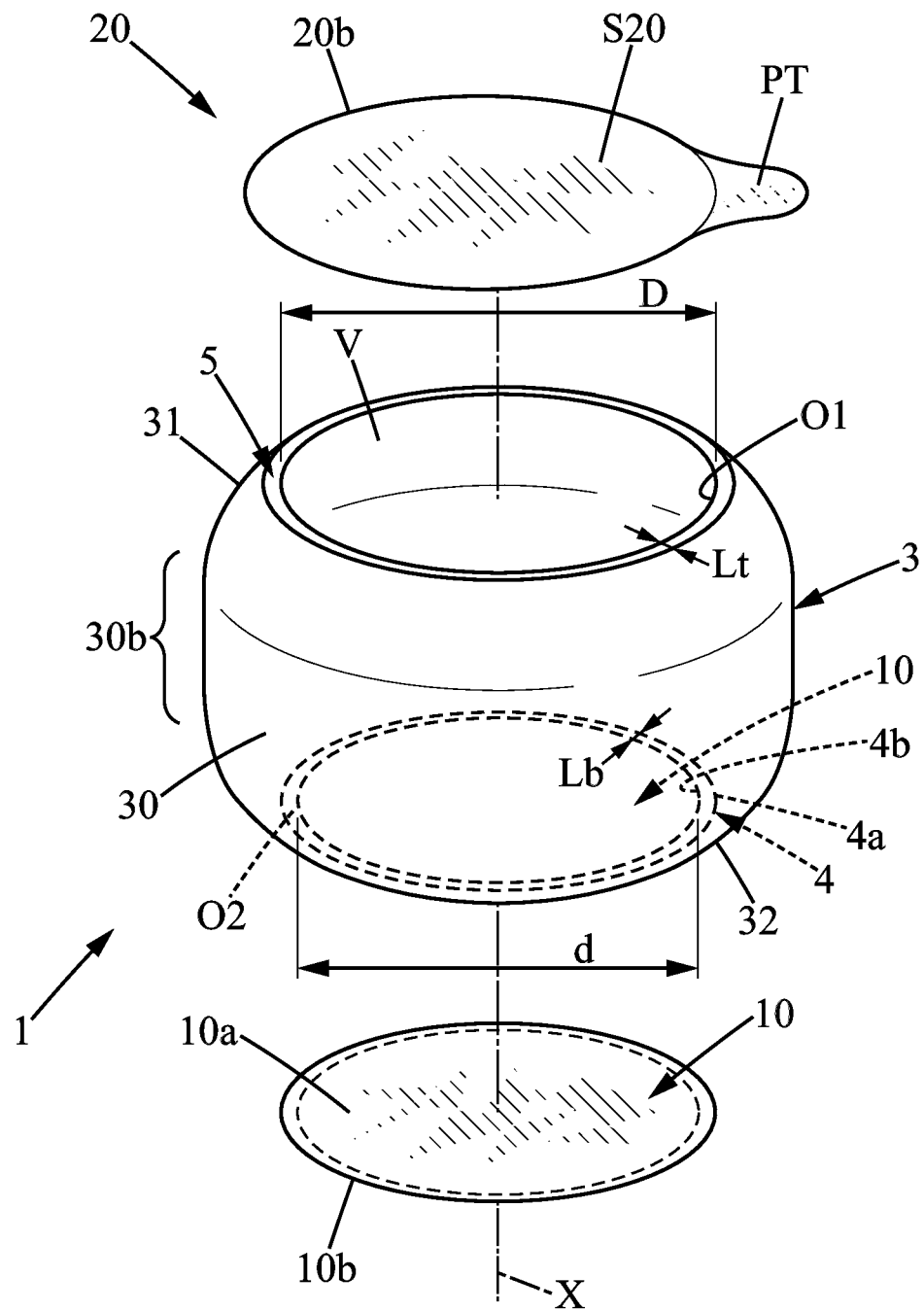
FIG. 1 is a perspective view of a container according to a first embodiment of the invention.
Figure 7:
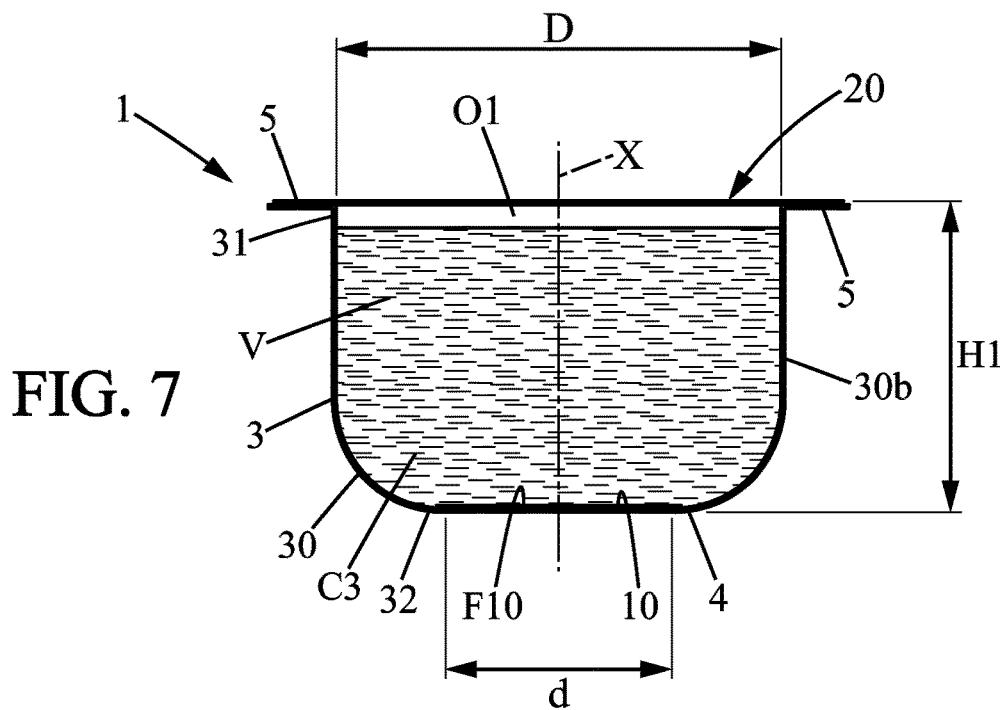
FIG. 7 is a longitudinal section view of a container having a top flange protruding externally and sealed after filling with a food composition.
Figure 13:
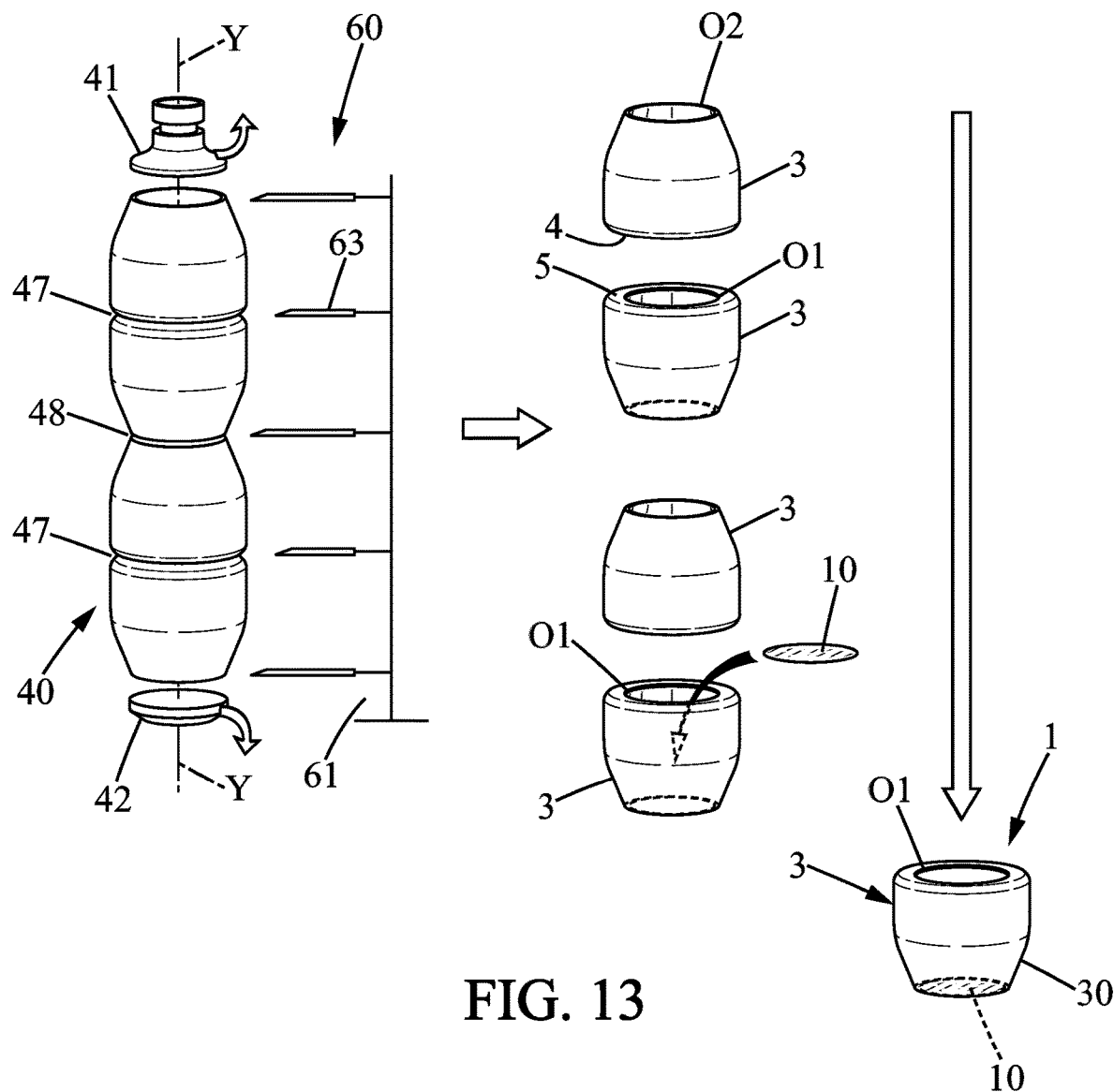
FIG. 13 illustrates a method of producing several containers from a same elongated pre-container.

Referring to FIGS. 1, 7 and 13, the container 1 may be provided with a single piece body, which defines a hollow body 3. The body 3 has a determined outer shape and is tubular, here with an annular shape in cross section. Circular or oval shapes for such cross section of the hollow body 3 may be cited as non-limitative examples. But any other suitable annular shape may be used. The side wall 30 of the body 3 extends longitudinally, from an annular base 32 to a top 31 of annular shape. The side wall 30 typically extends around a longitudinal axis X, which may optionally be a central axis or a symmetry axis.

The hollow body 3 is here made of plastic material, typically a single plastic material, for example thermoplastic material, and can be obtained after cutting a pre-container 40 that is obtained by blowing a plastic material, for example by blow molding a preform. In this latter case, as illustrated in FIG. 13, at least one cutting operation may be performed in the pre-container 40 to define opposite openings O1, O2, so that the body 3 has a tubular shape without having narrow openings (base opening O2 and top opening O1 are relatively wide as compared to the maximal radial size of the hollow body 3). In the following, the opposite openings O1 and O2 are to be interpreted as wide openings due to a diameter or equivalent characteristic size superior or equal to half (or possibly superior or equal to three quarters) of the diameter or similar radial size measured at a maximum of section of the side wall 30 of the body 3.

A thermoplastic material for the body 3 may typically be polyethylene terephthalate (PET), polypropylene, polyethylene (non-limiting examples) or other plastic material convenient for blow molding. Polyethylene terephthalate (PET) can be preferred due to certain very advantageous properties of bodies made from this material (namely their good mechanical resistance, the facility to be filled with a hot liquid or substance, the good transparency of the PET which does not adversely affect the appearance of the content, a relatively good barrier effect to oxygen).

More generally, the body 3 can be made of any suitable thermoplastic material, possibly with at least one additional layer of a material suitable to be blow molded. Plastic suitable for other forming technologies may also be used. In such case, the plastic material is compatible with: thermoforming, injection molding, Extrusion Blow Molding (EBM), Injection Stretch Blow Molding (ISBM), Roll and Blow (R&B).

Figure 3A:
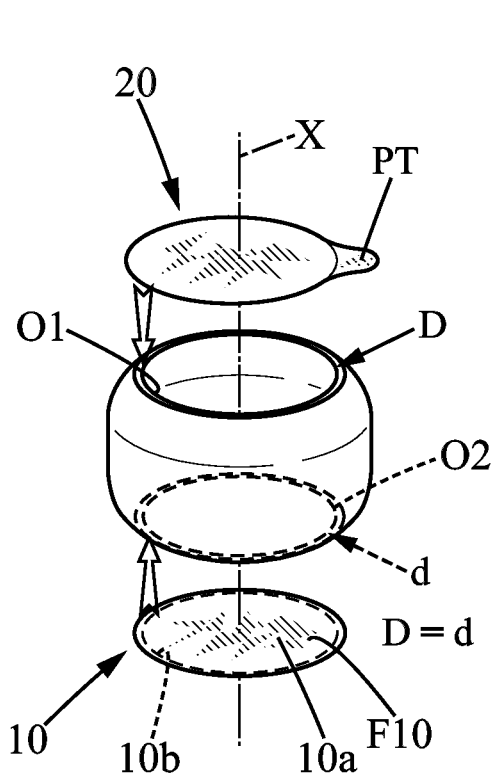
FIG. 3A is an exploded view of a container such as in FIG. 1, showing a first option for fixing the flexible base lid that defines the bottom portion of the container.
Figure 3B:
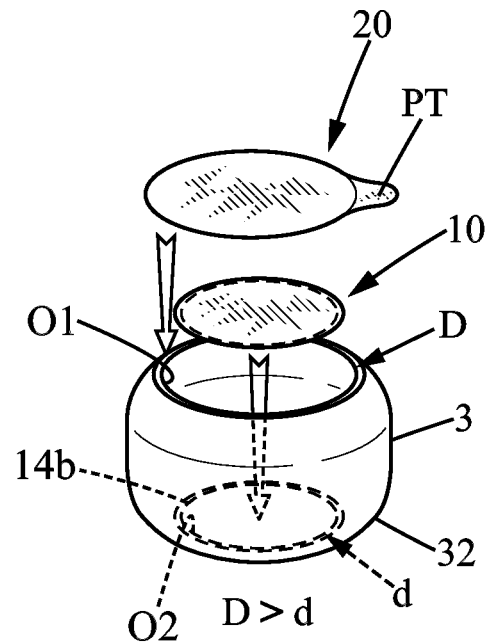
FIG. 3B is an exploded view similar to FIG. 3A, showing a second option for fixing the flexible base lid.

The top opening O1 of the hollow body 3 is defined at the top 31, at the opposite from a bottom portion extending transversally with respect to the longitudinal axis X. The top opening O1 may be intersected by the longitudinal axis X and allows content C3 of the container 1 to be retrieved by the consumer. Referring to FIG. 1 or 7, it can be seen that this top opening O1 is typically a particularly wide opening, having typically a diameter D or similar characteristic radial size superior to 35 or 40 mm. This may be advantageous to allow a spoon to be introduced in an interior volume V through the top opening O1. Such wide top opening O1 is required when using the container 1 for receiving a set fermented dairy composition or similar food composition where use of a spoon is convenient for efficiently retrieving the content C3. As shown in FIGS. 1 and 3A-3B, the base opening O2 is also wide and provided with a characteristic diameter or analog size preferably superior to 35 mm.

A top lid 20, here a flexible top lid, is in annular contact with the top 31 to seal the top opening O1. The cutting operation to obtain the opposite openings O1, O2 may be performed by transversally cutting a pre-container 40 or a bottle-like piece (partly cut piece of pre-container 40'), which is stretch blow molded from a preform (not shown).

Due to this specific method, PET may advantageously be used to define the hollow body 3. Indeed, PET is of interest to maximise material performance per gram in the stretched area. Regarding containers usually available for dairy products, it is observed that polypropylene or polyethylene are typically used, not PET. But PET may be advantageously used when the bodies 3 are obtained by trimming a pre-container 40. Such kind of polyester is of interest due to high scale (preforms), link into PET industry roadmap, recyclability, transparency with high quality (better than polypropylene or polyethylene for instance).

Referring to FIGS. 1, 4A-4C, 7-8 and 18, the annular base 32 is provided with a base flange 4, of annular shape, that continuously surrounds the base opening O2 of the hollow body 3. The base flange 4 typically extends adjacent to a lower end of the side wall 30 and/or may be closer to the side wall 30 and arranged away from the longitudinal axis X. The flexible base lid 10 is in sealing contact with the base flange 4.

The flexible base lid 10, distinct from the hollow body 3, is in annular sealing contact with the base flange 4 to close the base opening O2 and define all or part of the bottom portion. Such bottom portion and the side wall 30 delimit the interior volume V of the container 1, which is suitable for receiving a product. As the body 3 is here a blow molded piece, there is not partition wall integral with the body 3 to partition the interior volume V, as illustrated in FIGS. 1 and 3A-3B.

Referring to FIGS. 3A and 3B, the flexible base lid 10 is affixed to an annular seat defined in the annular base 32 of the hollow body 3. Such seat is either facing upwardly, or facing downwardly. Referring to FIG. 3B, the seat is at least partly defined by an upper face 14*b* of annular shape of the base flange 4. Here, it can be seen that the base flange 4 protrudes radially inwards.

Option of FIG. 3A provides attachment of the flexible base lid 10 to a lower face 14*a* (see also FIG. 6C) of the base flange 4. In such case, the base flange 4 could also be an outwardly extending flange but embodiments with an inner base flange 4 are of interest to minimize size of the flexible base lid 10.

Figure 16:
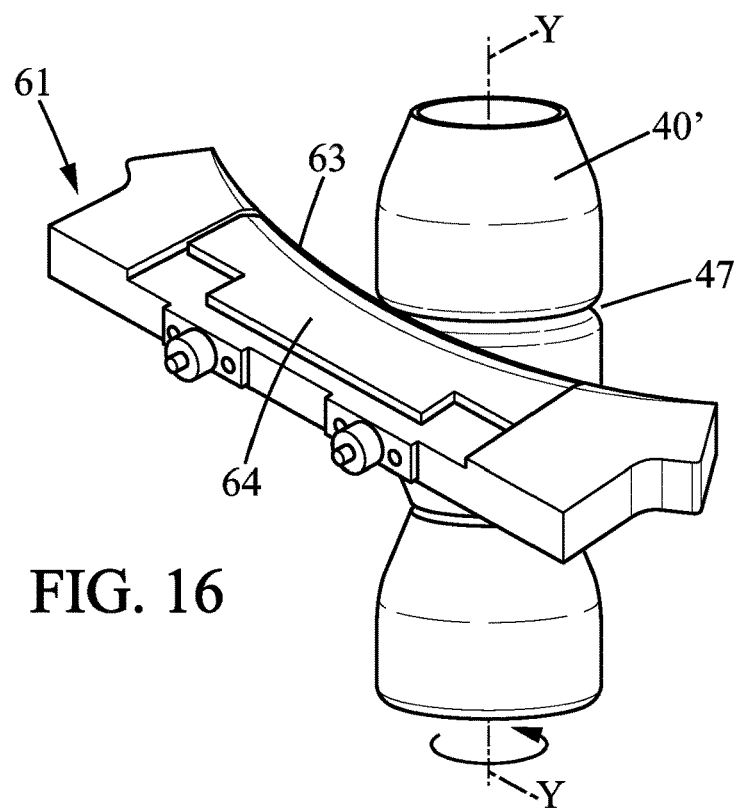
FIG. 16 is a detail of the trimming equipment of FIG. 15, showing a cutting element in contact with an elongated sidewall suitable to be divided into several hollow bodies.

FIGS. 3A-3B and 16 are exemplary embodiments showing that the diameter or characteristic size D of the top opening O1 and the diameter or characteristic size of the base opening O2 may greatly vary. While in FIG. 3A the diameters D and d are identical or similar, FIG. 3B shows a base opening O2 of lower size due to increased transverse extension of the annular base 32 and/or more pronounced tapering of the side wall 30 near the base 32, as compared to the embodiment of FIG. 3A. When D is superior to d, it may be easier to introduce the flexible base lid 10 through the top opening O1 and then seal it on the upper face 14*b* of the base flange 4. Additionally, depending on the kind of content C3, it may be suitable to have a higher thickness in the foil material of the base lid 10 and strength (pressure strength in particular) may be increased by slightly reducing the size or diameter d of the base opening 10.

The container 1 is provided with flexible top lid 20 of suitable size and shape to close the top opening O1. The flexible top lid 20 is arranged in sealing contact with the top 31, especially in annular contact with a top flange 5 defined entirely above the side wall 30. Such top flange 5 may be crown-shaped. When the top opening O1 has a diameter or maximal radial size D, greater than or equal to 30 or 35 mm, it is understood, that a central closing portion of the top lid 20 has same characteristic size. Such size D may be inferior or equal to 100 mm.

Similarly, when the base opening O2 has a diameter or maximal radial size d, greater than or equal to 30 or 35 mm, it is understood, that the central portion 10*a* of the base lid 10 has same characteristic size as it defines a closing portion. Such size d may be inferior or equal to 100 mm.

Here, the hollow body 3 is typically provided with two opposite axial ends defining the respective flanges 4 and 5, the container 1 being a double-lidded container as the top opening O1 and the base opening O2 are each sealed, without defining any passageway in the sealed state. The piece of plastic material used to define the bi-flanged body 3 is preferably easy recyclable material, for example material having shape memory properties so that a local pushing action on the side wall 30 can flex the material without causing significant cracks.

In the present application, the vacuum leak resistance is an indicator of how hermetically the body 3 and at least one of the lids 10, 20 are fastened. The higher the vacuum leak resistance is the better hermetically the body 3 and the container lid 10 or 20, respectively, are fastened. The vacuum leak resistance is measured by immersing a sealed container at atmospheric pressure into water, subjecting to vacuum to create in internal pressure inside the container 1, and determining the depression under which bubbles or product leak from the sealed container, per surface of sealing area. The absence of leaks indicates air tightness. Vacuum leak resistance can be determined according to the following procedure:

Material:
Bell Jar with transparent bell, for example Lippke® 1350 or 1360;
Vacuum pump, for example double head diaphragm pump;
Procedure:
Set test depression and test time to 10 seconds
Provide sample(s) at room temperature, preferably from 20 to 25° C.
Fill the vacuum chamber with tap water at room temperature, preferably from 20 to 25° C.,
Plunge sample to be tested in the water, preferably with the lid on the top to facilitate reading
Wait until residual bubble disappear
Close the bell and start the pump
Reach the depression to be tested, wait 10 seconds, and observe if bubbles or product leak from the sample(s)
Optionally repeat with higher depressions, and note the depression at which bubbles or product leak.
Divide depression by the surface of the sealing area, to obtain the vacuum leak resistance.

The vacuum leak resistance is preferably established as an average 5 samples, preferably 10 samples.

Referring to FIG. 3A, the hollow body 3 has here a symmetry axis defined by the longitudinal axis X and a median transverse plane may also define a symmetry plane of the hollow body 3. With such configuration, the base lid 10 may optionally be of same size and shape as the top lid 20. It is thus possible to have such symmetry, possibly with a pull tab in the base lid 10, so that a consumer has a free choice to open the container 1, either at the axial face on the base side or at the axial face on the top side. This may be advantageous when the containers 1 are stored loose in a bag, so that the user may quickly open the container 1, without need to turn the container on a predetermined side.

In the option of FIGS. 1 and 3A, with same size d, D for the respective opening diameters, the production process may also be facilitated. Indeed, it is most simple execution to form and trim such kind of hollow body 3. There is no requirement for a subsequent orientation in either axis. Downstream simplicity is thus obtained after cut/trimming of the pre-container 40.

Figure 18:
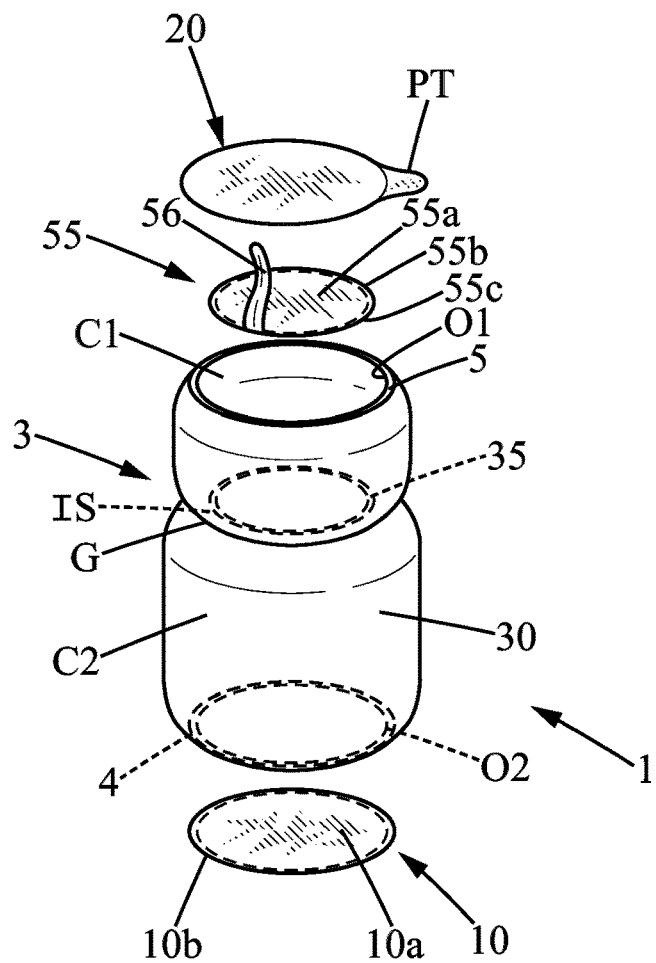
FIG. 18 is an exploded view of a two-compartment container in accordance with a third embodiment of the invention.

This option may be also of interest for a two-compartment container 1, when the two compartments such as shown in FIGS. 18 and 21 may be only be accessed by removing an outer lid chosen amongst the base lid 10 and the top lid 20 (this may be the case when an inner lid 55 is without any pull tab).

Referring to FIGS. 1, 4A, 7 and 10, the hollow body 3 may be provided with a substantially cylindrical portion 30*b*, which may be of interest for guiding purpose. Touchpoints defined by a portion of circular cross-section are easy to guide without lowering production rates. For instance, when manufacturing the body 3, such cylindrical portion 30*b* may be useful to enable rotative positive contact, especially when handling at high speeds the body 3 during steps of conveying, trimming, decorating.

Besides, when the body 3 is provided with a cylindrical area, compatible with high speed handling, this also provides a suitable area (flat zone as perceived in a longitudinal plane) for defining an optional decoration surface. For instance, the cylindrical portion 30*b* is compatible with inline digital printing or other marking technologies.

The portion 30b may be adjacent to the base flange 4, adjacent to the top flange 5, and/or extend at a distance of at least one of the flanges 4, 5 defined at the opposite ends of the hollow body 3. The sizes D, d of the respective opposite openings O1, O2 may be identical, or slightly different when having a side wall 30 of generally cylindrical shape. The top opening O1 may be optionally greater than the base opening O2 when having such cylindrical portion 30b.

Figure 9:
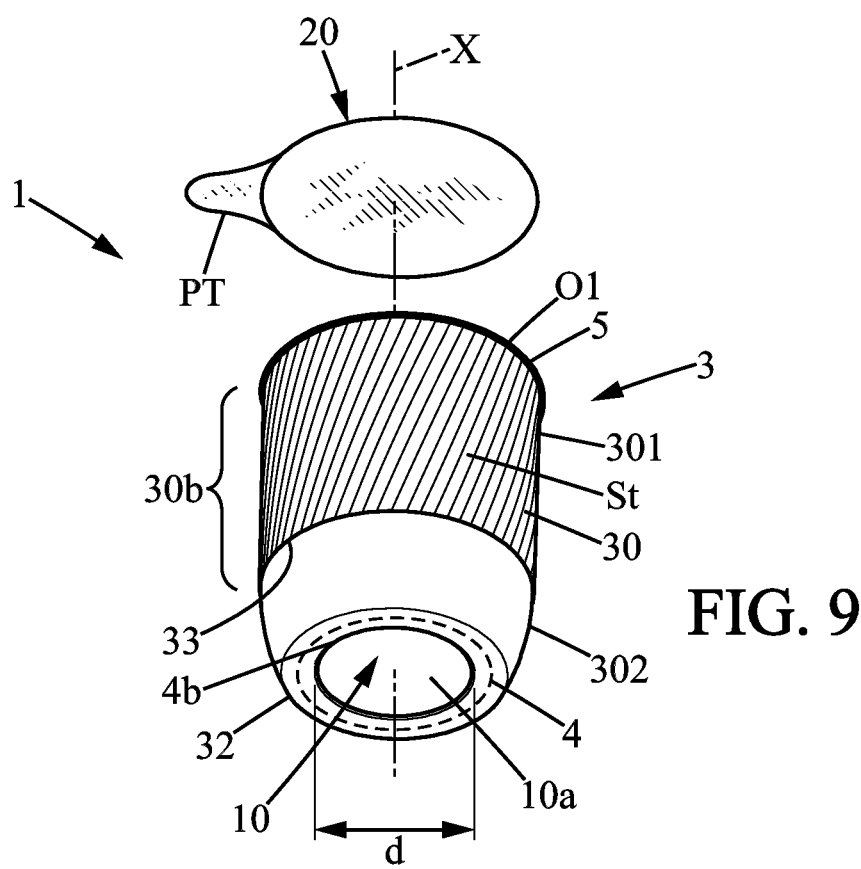
FIG. 9 is a perspective view from below of a container, after sealing of the base opening and before sealing of the top opening, in another embodiment of the invention.

In the exemplary embodiment of FIG. 9, the side wall 30 has a cylindrical portion 30b defined as or forming part of an upper portion 301, possibly directly connected to the top flange 5 and a lower portion 302 tapering from the cylindrical portion 30 toward the base 32, in a curved manner as clearly apparent in the FIG. 9.

The base 32 may optionally define an oval base opening O2 or other non-circular shape for the base opening 32, while defining a substantially planar bearing surface for stability purposes. In a variant, as illustrated in FIG. 9, the base opening O2 may be delimited by a circular free edge 4b of the base flange 4, while the base 32 has an outer rim of oval shape at intersection with the lower portion 302 of the side wall 30. Such configuration is of interest to stabilise product movement inside the container 1 in a sealed state. This prevents product degradation due to vibrations during transport when the texture/structure of the product is fragile. For a set fermented dairy product, this prevents product degradation and production of whey.

More generally, the side wall 30 may be provided with any ring-shape, either of circular cross-section, or including one or more portions with non-circular cross-sections or with non-symmetric shape.

Still referring to FIG. 9, it can be seen that the portion 30b and the lower portion 302 intersect and interconnect at a peripheral intersection line 33 that is here circular. The junction of the portion 30b with the top 31 and/or with the top flange 5 may be substantially circular. Accordingly, the upper portion 301 of the side wall 30 defines a generally cylindrical surface suitable for receiving a strip St, here defined by a decorative banderol, a sticker or any convenient wrapping element. The strip St may be added by an in-mold labelling method or the like, or added after the molding of the body 3.

A small step or shoulder appropriate for maintaining the decorative strip can be present or absent on the side wall 30 at the peripheral intersection line 33. Such a step does not protrude more than about 0.5 mm from the cylindrical surface defined by the cylindrical portion 30b.

The peripheral intersection line 33 is spaced and at a substantially constant distance from a support plane defined by the base 32 or by a bottom portion covering the base 32. The height of the lower portion 302 optionally corresponds to a minoritary fraction of the height H1 of the container 1. With such an arrangement, the upper portion 301 provided with the cylindrical portion 30b is particularly useful for displaying information and can be typically covered by a rectangular shaped strip St arranged in a form of a sleeve label. It is also compatible with e.g. inline digital printing.

Figure 10:
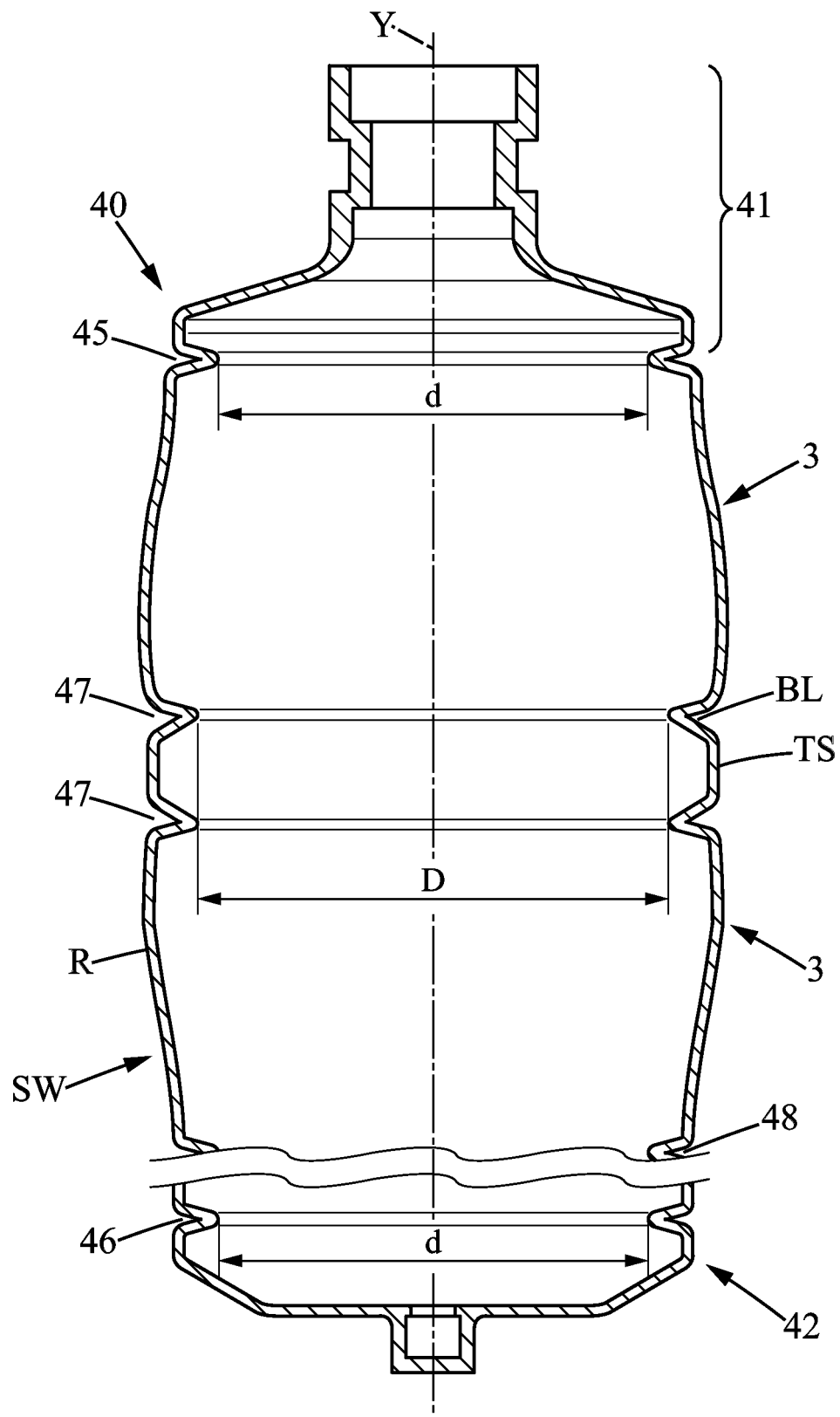
FIG. 10 is a longitudinal section view of an elongated pre-container adapted to define several hollow bodies.

Referring to FIGS. 4A-4B and 10, the side wall 30 may be designed to provide a difference in size between the top opening O1 and the base opening O2, when the flanges 4, 5 have similar or identical transverse size as measured in a longitudinal plane. For instance, the side wall 30 shown in FIG. 4A or 10 is suitable to define a top opening O1 of higher diameter D than the diameter d of the base opening O2. Such configuration is here obtained by use of the specific lower portion 302, which tapers downwardly, preferably in a curved manner. With such configuration, the content C3 is easy to retrieve by use of a spoon, especially when a circular cross-section or a continuously rounded cross-section is provided in the base 32 and in the lower portion 302.

Alternatively, the base opening O2 may be larger than the top opening O1. Independently or additionally, the side wall 30 may be continuously curved in a convex manner (as perceived from outside the container 1), from the top 31 to the base 32. This option, as shown in FIG. 4B, may be of interest to reduce overall height H1 of the container 1.

Figure 8:
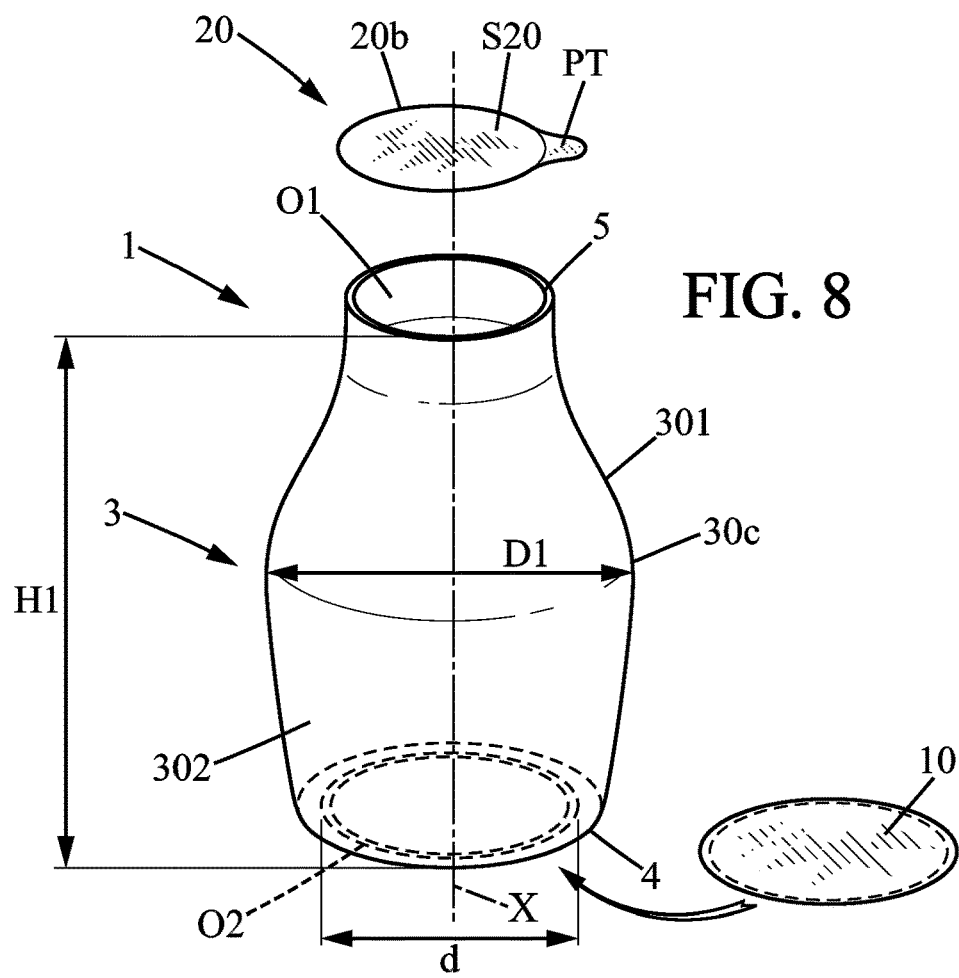
FIG. 8 is a perspective view of a container according to another embodiment of the invention.

Referring to FIG. 8, the container 1 may be provided with a top opening O1 slightly reduced as compared to the size of the base opening O2. A partly circular or fully circular section is here used. Besides, the container 1 may be provided with locally greater cross section substantially in the middle of the hollow body 3 or close to the base 32. For instance, the annular side wall 30 may comprise an upper portion 301 adjacent to the top 31 and a lower portion 302 adjacent to the base 32.

In the embodiment of FIG. 8 as in many other embodiments, the side wall 30 of the hollow body 3 may advantageously be provided with an upper portion 301 of cross sections of an increasing size with increased spacing from the top flange 4. With such configuration, a cylindrical portion 30b or a bulge 30c may optionally be provided at a distance from the top 31. The maximal outer diameter or similar greater dimension D1 of the body section, as measured perpendicularly to the longitudinal axis X, is preferably such that the ratio d/D1 remains superior to 1:2. More generally the following relation may be satisfied:

$$0.70 < d/D1 < 0.97.$$

Of course, the greater dimension D1 is not necessarily measured in a bulge 30c as in FIG. 8 and may be, for instance, a diameter of a cylindrical portion 30b.

The upper portion 301 may proportionally taper more, upwardly, than the lower portion 302 is tapering, downwardly. In the illustrated embodiment, the annular side wall 30 optionally comprises a peripheral bulge 30c at a junction between the upper portion 301 and the lower portion 302. Here, the annular side wall 30 comprises a bulge 30c having a circular cross section and maximal width of the upper portion is defined at the bulge 30c. Such bulge 30c may be of interest to prevent any slippage (downwardly or upwardly slippage) of a wrapping element or similar decorative banderol, without the need of forming an axial abutment shoulder or similar reliefs for maintaining such element.

Alternatively, the lower portion 302 may have a generally cylindrical shape and may entirely define the cylindrical portion 30b.

Regarding the flexible top lid 20, such lid is adapted to prevent use of any rigid cap or other cap means above the top 31 of the body 3. The flexible top lid 20 is thus the outermost upper element of the container 1 and may be directly used to form the primary surface for decoration. Digital inline printing or any kind of marking may be performed to define label information and/or decorative elements on the top surface S20 of the top lid 20.

In some options, using this arrangement with label information and/or decorative marks on the top surface S20 is of interest to provide a hollow body 3 that remains unwrapped and unmarked with printing material, whereby the body 3 is left "pure" for recycling valorization. The one piece hollow body 3 thus may entirely define the outer face of the side wall 30, without need for additional layer or marking material. The production method may also be simple as no labelling is required around the body side wall 30.

Referring to FIGS. 1, 8-10 and 18, an optional pull tab PT is here integrally formed with the flexible top lid 20. Easier removal of the flexible top lid 20 is obtained when pinching the pull tab PT that is entirely offset (radially outward) with respect to the top opening O1. The flexible top lid 20 adheres to the top 31 of the hollow body 3, using an adhesion force inferior to a tearing force required to tear the top lid 20. The top lid 20 is thus entirely removable without tearing from the annular top flange 5 or similar top portion when pulling the pull tab PT or similar peripheral portion. In other words, no lid material remains affixed to the ring-like hollow body 3 when the top 31 is fully open. Easy separation from the ring-like body 3 (for each of the lids 10, 20) is of interest for disposal of the body 3, which is typically highly suitable for recycling and economical valorization.

Except at such optional single pull tab PT, the flexible top lid 20 does not protrude radially outwards as compared to the side wall 30.

While FIG. 1 shows the pull tab PT defined as an extension locally protruding beyond an outer annular rim of the top flange 5 defined at the top 31 of the hollow body 3, other options may be used to have a gripping extension making removal of the flexible top lid 20 easier. For example, the pull tab PT may be in a folded state without protruding beyond the outer annular rim 5a of the top flange 5.

The flexible top lid 20 forms here a single foil sealing system, only comprising a sealing foil that is fixed to an upper face 15b of the top flange 5, in order to seal the top opening O1. An appropriate cut is performed to define an outer shape of the sealing foil. The sealing foil may be a one-piece foil of a film material suitable for food contact. The material of the sealing foil allows the sealing foil to be bendable. The material or foil might be comprised of paper, plastic, aluminium and/or associations thereof. In a preferred embodiment the material and/or foil is metal-free. Preferably, the material and/or foil has low water permeability, is approved for food contact and is not flammable.

Same properties may be used to define the flexible base lid 10. In the illustrated embodiment, the flexible base lid 10 is continuously adhering to an upper face 14b (see FIG. 6B) of the base flange 4. In a variant, the flexible base lid 10 may partly or continuously adhere to a lower face 14a of the base flange 4.

In some options, at least one part of the flexible base lid 10, for example a part not in contact with the hollow body 3, may be provided with at least one rigid portion (not altering peelability of the base lid 10) or may be reinforced by at least one additional layer. Such part not in contact with the hollow body 3 is typically in contact with content C3, as illustrated in FIG. 7. The part of the base lid 10 in contact with the seating area, defined by the base flange 4, is here a circumferential margin portion 10b. The annular margin portion 10b is a ring-shaped margin portion extending entirely around a main central portion 10a of the flexible base lid 10.

Now referring to FIGS. 1, 3A-3B, 4A, 4B, 5, 8-10 and 21, it can be seen that the top flange 5, of annular shape, may be an inner flange. Indeed, the top flange 5 is provided with an inner edge 5b, proximal to the longitudinal axis X, radially offset inward as compared to the side wall 30. With such kind of top flange 5, without any outer protruding edge as compared to the side wall 30, the bulk of the container 1 is not perceived as thin and trays may be filled with the containers 1 without significant space between the containers, unlike containers having outer flanges or similar collars. The container 1 may be more compact. It is also understood that the bodies 3 are designed to maximize amount of content/product per tray and/or per pallet.

Optionally, the opposite axial ends of the containers 1 are of similar or identical thickness and/or may be adapted to define a bearing surface during transport in a pallet. When the bodies 3 are provided with a tapering shape, the containers 1 may optionally be arranged in rows in a pack, in a tray or in a pallet, with alternation of:

containers 1 of a first group, each tapering upwardly; and
containers 1 of a second group, each tapering downwardly.

This kind of arrangement may be advantageous to reduce interspace between two adjacent containers 1 in a same row, especially when the mutually facing concave conical sections and the convex conical sections extend parallel or almost parallel with a small gap inferior to 5 mm, possibly with a contact (close cooperation between the inclined portions facing each other). Of course, the containers 1 of the first group and of the second group may be obtained in a same production method.

In some options, the top flange 5 entirely defines the top 31 and is directly connected to the side wall 30. This may be the case when the top flange 5 is either an inner flange or an outer flange.

In other options, the top flange 5 defines an inner flange and is extended, outwardly, by a curved portion or a shoulder, of annular shape, which connects the side wall 30 to the top flange 5.

It can also be seen that the base flange 4, of annular shape, is typically an inner flange, which is not visible when observing the container 1 in a sealed state on store shelves. The base flange 4 is provided with an inner edge 4b, proximal to the longitudinal axis X, radially offset inward as compared to the side wall 30. With such kind of base flange 5, without any outer protruding edge as compared to the side wall 30, the container 1 is perceived as more compact.

In some options, the base flange 4 entirely defines the base 32. In other options, the base flange 4 is extended, outwardly, by a tapering or curved portion of the base 32, of annular shape, which defines an axial peripheral outer face around the lower face 14a of the base flange 4.

Each of the base flange inner edge 4b and the top flange inner edge 5b are preferably edges obtained by a cut performed in a transverse direction. As a result, the inner edges 4b and 5b may be arranged in a thinned part of the corresponding flange 4 or 5, opposite to a thick part closer to the side wall 30. Alternatively, the extension of each of the flanges 4, 5 may be reduced in such a way that the thickness is substantially constant or not significantly reduced, i.e. without variation superior to 15 or 20 µm in the thickness profile of the flange for instance.

Figure 2:
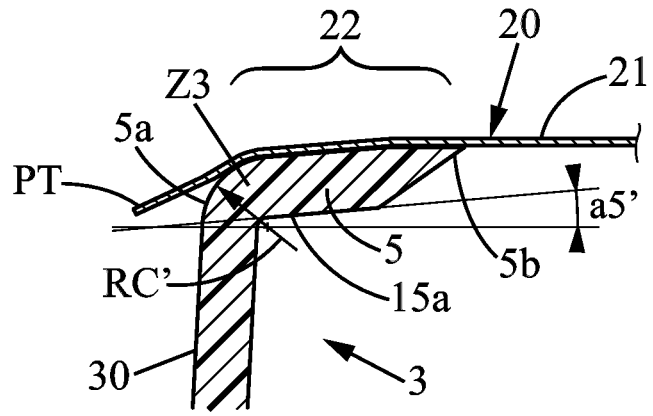
FIG. 2 is a longitudinal section view showing a detail in the upper part of a container in a closed state.
Figure 4D:
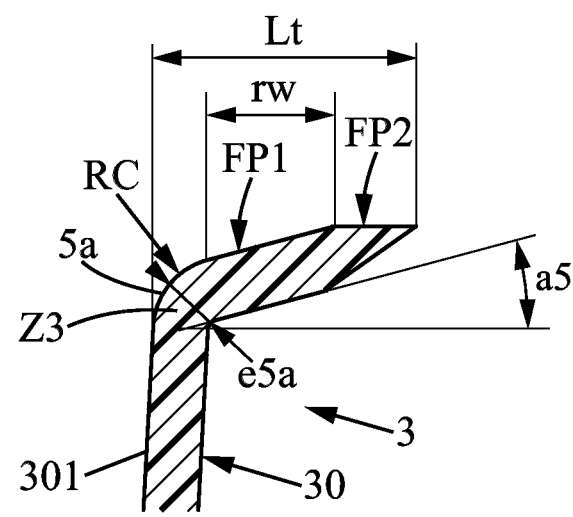
FIG. 4D illustrates a detail of the top flange obtained before sealing the flexible top lid, in accordance with a preferred embodiment.

Referring to FIGS. 2 and 4D, the outer rim 5a of the top flange 5 has, at least before the sealing, a determined thickness e5a comprised between 400 µm and 600 µm. Such determined thickness e5a is sufficient to obtain a hinge effect at annular region Z3. Such hinge effect prevents cracks to be formed, especially when pressure applied onto the flange is subject to repeated variations.

Such hinge effect is easily obtained when the top flange 5 is tapering upwardly (at least before the sealing of the flexible top lid 20), so as to define the angle a5, here a slope angle between 5° and 20°, preferably between 10° and 20°, to the horizontal at the ring portion 22. Typically, the slope angle a5 (in unsealed state of the flange 5) is between 13° and 17°, for example 15°.

Figure 6A:
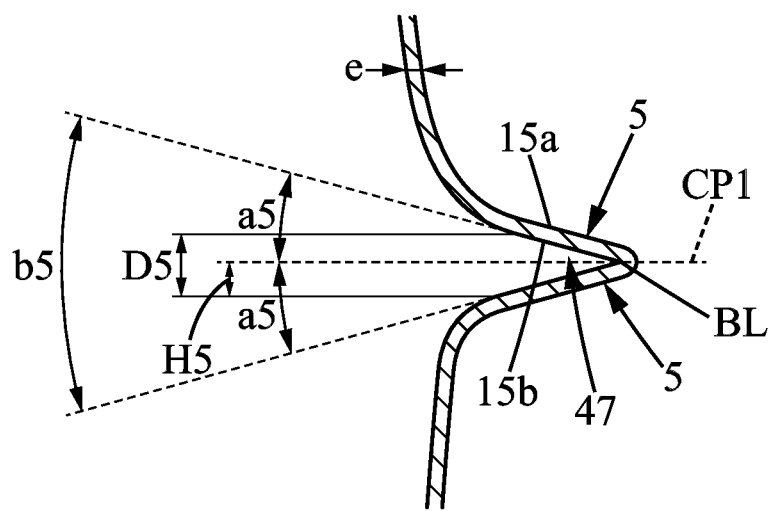
FIGS. 6A, 6B and 6C are each a longitudinal section view of a detail in the side wall of an elongated pre-container, before a trimming operation through a circumferential groove.

The top flange 5 formed by the body 3 is provided with an exterior face, here the upper face 15b, having a flat portion of annular shape. "Flat" here means that the longitudinal profile (as perceived in any longitudinal plane including the longitudinal axis) is straight in the flat portion. Referring to FIG. 4D, the radial width rw of such flat portion of the upper face 15b is of at least 1.5 mm, preferably at least 2 mm, before the sealing. FIG. 6A shows such straight profile in the upper face 15b of the top flange 5, before the sealing.

As illustrated in FIG. 2, the ring portion 22 may be less angled after the sealing. The top flange 5 has a flat portion formed by a first flange portion FP1 of the flange and a second flange portion FP2, as illustrated in FIG. 4D. The first portion FP1 distal from the inner rim 5b, which is formed in a second portion FP2 of the flange 5, which is typically horizontal (perpendicular to the longitudinal axis X). The second portion FP2 is obtained after a cutting step performed in the pre-container 40.

After the sealing by the top lid 20, the first portion FP1 may extend parallel or nearly parallel to the second portion FP2 (adjacent to the first portion FP1). The second portion FP2 may be a horizontal edge portion (on the inner side of the top flange 5) that is horizontal before and after attachment of the top lid 20, while the first portion FP1 is sloped (with angle a5) at least before the sealing. Preferably the outer rim 5a is formed where there is a minimum radius of curvature in the longitudinal profile of the hollow body 3, such a radius of curvature RC being here comprised between 1.0 and 2.0 mm (at the outer rim 5a), before the sealing by the top lid 20.

The flat portion FP1 forms or is part of the ring portion 22 that is heated during the sealing. This is of interest to have efficient sealing, especially when PET material is involved.

When the hollow body is in PET or similar thermoplastic material, the flange 5 may have a radial extension Lt superior or equal to 2.0 mm, preferably 2.5 mm, and inferior or equal to 5.0 mm. The radial extension Lt is typically measured in a plane (for instance the opening plane) perpendicular to the longitudinal axis X.

In some variants, as illustrated in FIG. 7, the top 31 may be provided with a top flange 5 protruding radially outwards and adapted to be in annular sealing contact with the flexible top lid 20. Optionally, when the top flange 5 is provided with a protruding portion, defining a maximum of radial extension for the flange 5, a pull tab PT may optionally be added and selectively in contact with the protruding portion. In another embodiment, the side wall 30 may be provided with a circumferential bead.

The top flange 5 and/or the circumferential bead may be of interest to provide a protective barrier increasing shock resistance during transportation in a tray and/or in a pallet, and thus limiting deformation of the side wall 30 due to lateral impacts/shocks.

The base flange 4 may be provided with same structure as top flange and thus can be optionally sealed in similar manner.

Figure 5:
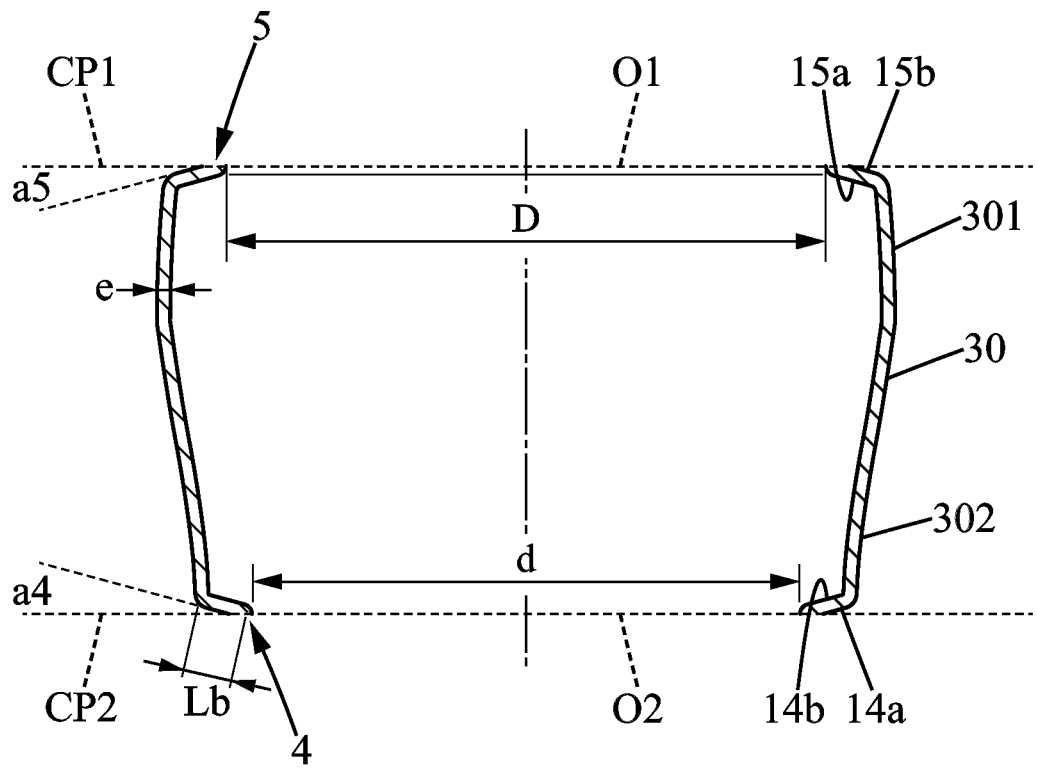
FIG. 5 is a longitudinal section view of a hollow body that can be obtained using the pre-container of FIG. 12.

As illustrated in FIGS. 1 and 5 in particular, the flanges 4, 5 of annular shape may have each a size or extension length defined transversally, and measured in a plane perpendicular to the longitudinal axis X.

Referring to FIG. 1, the annular margin portion 10b and the base flange 4 may have a same or almost same extension in a generally radial direction, i.e. same length Lb defined between the base free inner edge 4b and an outer base rim 4a. Typically, the margin portion 10b overlies one of the annular faces of the base flange 4 that are formed between the inner edge 4b and the base rim 4a.

The base rim 4a may be defined at a peripheral intersection between:
the base flange 4, and
a longitudinally curved outer portion of the base 32 or a lower portion 302 of the side wall 30 directly connected to the base flange 4.

Here, the base flange 4 has a length Lb defined transversally between the base rim 4a and the base free edge 4b. This length may be substantially constant and such that:
1.0 mm Lb 5.0 mm, preferably 1.5 Lb 4.0 mm, preferably 2.0 Lb 2.5 mm.

For example, the length Lb may be inferior or equal to 3 mm, while the base opening O2 is wide, typically with diameter d or equivalent size being more than 30 mm. More generally, the ratio Lb/d may be inferior to 1:10. This is of interest to prevent any retaining (even provisional retaining), by the base flange 4, of a detached base lid 10. It has been experienced that, when such ratio is higher than 2:10, probability of retaining one of the wide lids 10, 20 in the interior volume V quickly increases. As a result, the user has significant effort to do, to ensure that the lid 10 or 20 escapes from the interior volume V defined by the hollow body 3 when the opening O2 is too narrow and/or when the radial extension of the inwardly orientated base flange 4 is too great.

Figure 6B:
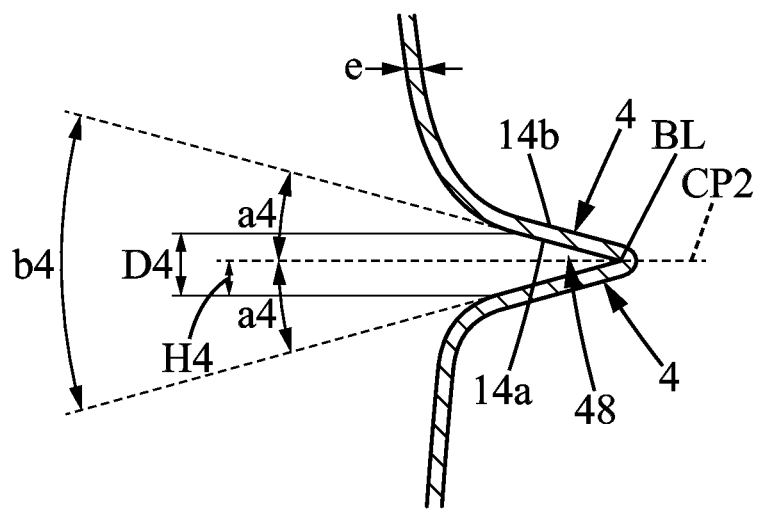
Figure 6C:
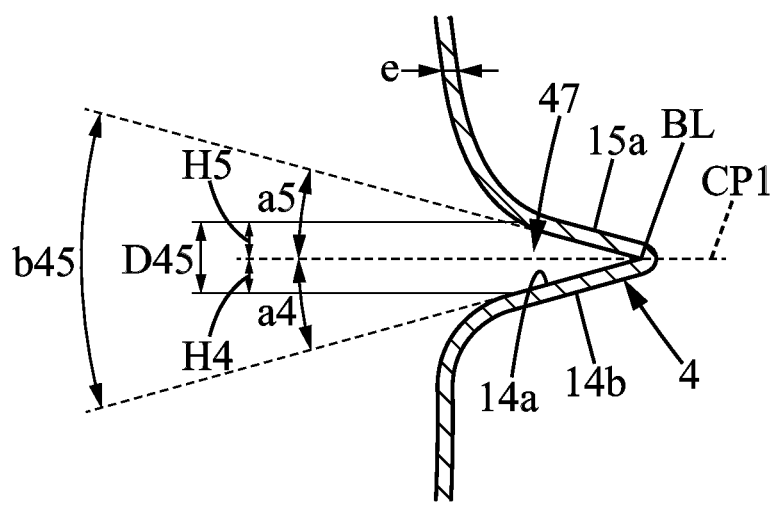

In some options, the base flange 4 may also extend slightly upwardly as illustrated in FIGS. 5 and 6B-6C. Here, the base flange 4 is tapering downwardly, so that a shallow angle a4 is defined between a cut plane CP2 perpendicular to the longitudinal axis X and the lower face 14a of the base flange 4. The angle a4 is typically inferior or equal to 20°, preferably strictly inferior to 20°, so that height H4 of the base flange 4 is minimized. The longitudinal offset between the base rim 4a and the inner free edge 4b, defining the height H4, may be inferior to 2 or 3 mm and the ratio H4/H1 is preferably inferior to 2/100 or 3/100, where H1 is total height of the container 1 in a sealed state.

Similarly, the top flange 5 is tapering upwardly, so that a shallow angle a5 is defined between a cut plane CP1 perpendicular to the longitudinal axis X and the upper face 15a of the top flange 5. The angle a5 is typically inferior or equal to 20°, preferably strictly inferior to 20°, so that height H5 of the top flange 5 is minimized. Such height H5 may be inferior to 2 or 3 mm and the ratio H5/H1 is preferably inferior to 2/100 or 3/100.

Angles a4, a5 may be ach between 10 and 40°, preferably between 20 and 40°.

Due to direct connection of the side wall 30 to the respective flanges 4 and 5, the side wall 30 may define per se more than 90%, preferably more than 95%, of total height H1 of the container 1. This is also due to the extremely low thickness of the flexibles lids 10, 20, each not thicker than 300 μm in preferred embodiments. Typically, maximal thickness of the top lid 20 is comprised between 5 and 200 μm for instance, and preferably between 10 and 100 μm, and even more preferably between 20 and 50 μm, for instance between 20 and 40 μm. Actually, the flexible top lid 20 is so flexible and sufficiently wide (with D superior to 30, 35 or 40 mm), so that it may be easily submitted to four consecutive folding in half operations, keeping a flat configuration in the multi-folded state. Such flexibility and low thickness if of interest to facilitate quick access to the interior volume V though the wide top opening O1.

The top flange 5 may have a same/constant transverse extension in a generally radial direction, i.e. same length Lt defined between the top flange free inner edge 5b and an outer rim 5a (formed on an upper axial face of body 3)

defining a peripheral intersection between the top flange 5 and an upper end of the side wall 30. Of course, the extension or length Lt is here measured along the upper face 15*b*, between the outer rim 5*a* and the inner edge 5*b*.

The outer rim 20*b* of the top lid 20 may be defined in a margin portion that overlies the top flange 5, as illustrated in FIG. 1. In the top lid 20, an adhering ring portion 22 (see FIG. 2) may also be a circumferential margin portion (similar to the margin portion 10*b* in the base lid 10) of same extension as compared to extension of the top flange 5, as measured in any longitudinal plane parallel to the longitudinal axis X. The adhering ring portion 22 is fixed on the upper face 15*b* that extends without any significant relief. As illustrated in FIG. 2, the pull tab PT extends beyond an outer limit of the adhering ring portion 22.

In the illustrated embodiment, the margin portion 10*b* may be provided without any pull tab or tongue, thus minimizing amount of material in the base lid 10.

While in FIG. 1, the margin portion 10*b* is as narrow as the annular base flange 4, the margin portion 10*b* may be of different size in some variants. For instance, the margin portion 10*b* may extend radially outward beyond the outer rim 4*a*. Such arrangement may be provided when the base lid 10 partly or entirely extends below the base flange 5 (due to an attachment to the lower face 14*a*). When the base lid 10 entirely extends above the base flange 5 (due to an attachment to the upper face 14*b*), the margin portion 10*b* may extend radially outward and/or may extend upwardly, beyond the outer rim 4*a*.

As the hollow body 3 is typically semi-rigid, for example as rigid as plastic bottles containing gaseous water or sodas, the body 3 may be provided with an annular part Z3 that acts as a hinge at a junction between the top flange 5 and the upper end of the side wall 30, i.e. in a region adjacent to the outer rim 5*a* as illustrated in FIG. 2. When heat sealing the flexible top lid 20 and possibly after, the top flange 5 may be slightly movable axially inwards. Same or similar properties may be provided for the base flange 4 (with slight upward longitudinal mobility), in order to have similar hinge effect. This prevents formation of cracks and provides a damping effect, at least with respect to vertical load, suitable to prevent accidental leaks at or around the top opening O1 and at or around the base opening O2.

Of course, the hinge effect is only of low amplitude, as plastic material of the hollow body 3 is significantly more rigid than the foil material used for the flexible top lid 20 and the flexible base lid 10.

Typically, the side wall 30 is provided with a generally circular cross section in one or more portions or in its entirety. This may be of interest, for example to define touch points during rotary trimming operation and/or handling in manufacturing. While the body 3 is especially of light weight, rigidity may be locally invested to be a bit higher only at some key touchpoints or touch annular area (in correspondence with a handling and/or trimming machine).

When a preform is used to define a pre-container 40, such preform may optionally be dimensioned and designed to offer maximal strain hardening benefits at the outer touchpoints of a concentric ring. Such touch points are preferably provided at an intermediate axial location, between the base flange 4 and the top flange 5.

Referring to FIGS. 5, 6A, 6B and 6C, the base flange 4 and the top flange 5 may be provided with a thickness similar to average thickness e in the side wall 30. Additionally, the flanges 4, 5 may be arranged similarly with respect to the side wall 30, by extending transversally and inwardly. Here, the top opening O1 is wide and defines a diameter D which may be slightly higher than corresponding diameter d of the base opening O2. This is here due to longitudinal tapering of the side wall 30 in a lower portion 302, below an upper portion 301 that may be substantially cylindrical. Such upper portion 301 may also taper in opposite direction as compared to the tapering of the lower portion 302.

Figure 11:
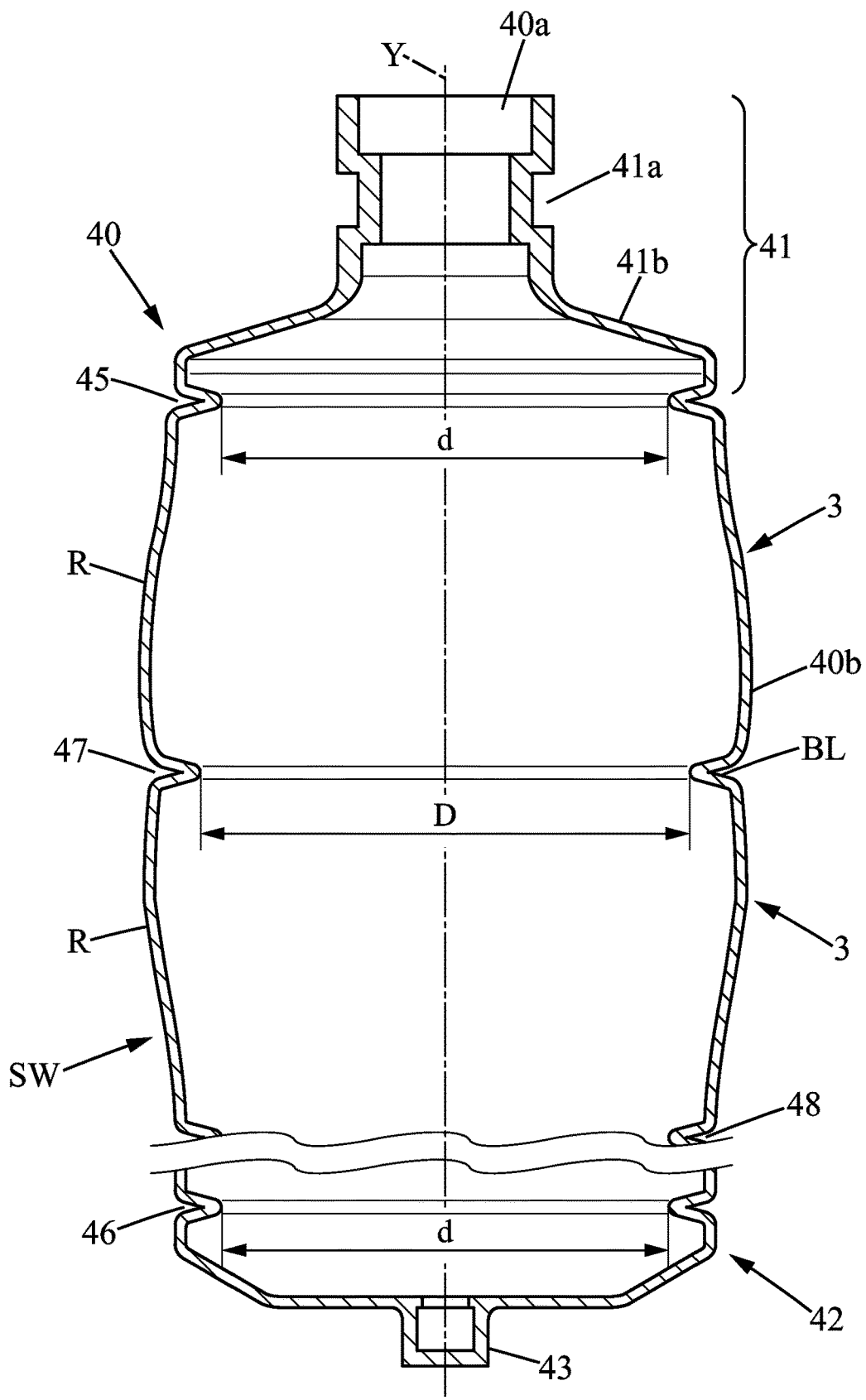
FIG. 11 is a longitudinal section view of an elongated pre-container adapted to define several hollow bodies.
Figure 12:
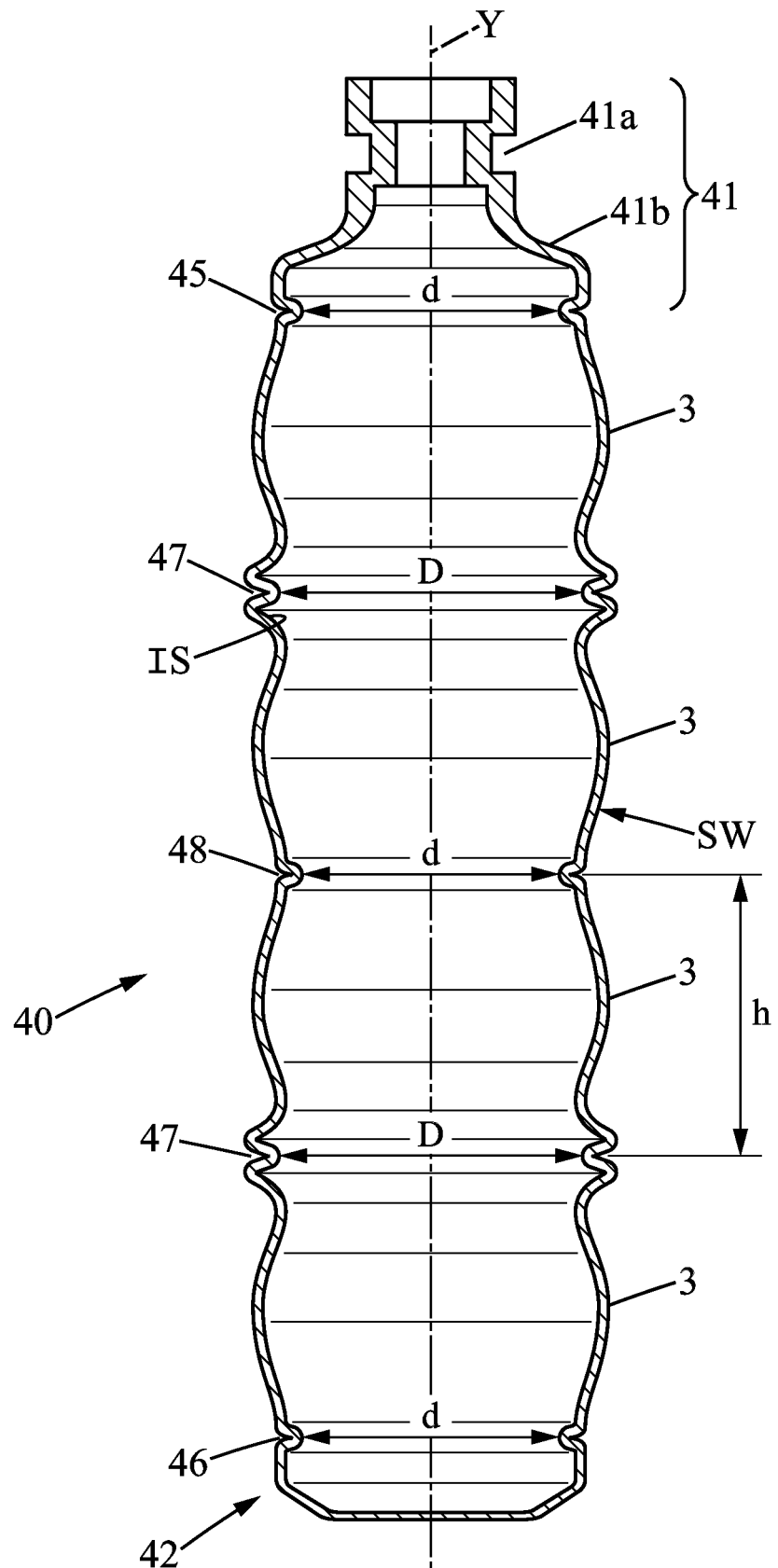
FIG. 12 a longitudinal section view of an elongated pre-container adapted to define several hollow bodies each provided with an inner shoulder in the body side wall.

Now referring to FIGS. 11, 12 and 13, it can be seen that the pre-container 40 is suitable to obtain one or more hollow bodies 3. Such pre-container 40 may be an elongated piece of plastic having an opening that is typically a single opening 40*a*, optionally a narrow opening 40*a*. The central axis Y of the pre-container 40 (as shown in FIGS. 10 to 13) coincides with the longitudinal axis X of each body side wall 30, before a cutting of the pre-container 40. Preferably, a plurality N of hollow bodies 3 may be obtained from such pre-container 40, N being a natural number greater than or equal to 2. N is typically equal to 2, 3, 4 or 5.

In the sidewall SW of the multi-cell body (here, an elongated body part) of the pre-container 40, N+1 circumferential grooves 45, 46, 47, 48 may be provided. Such circumferential grooves 45, 46, 47, 48 are not too deep, thus limiting transverse extension of the flanges 4, 5 obtained after a cut through the groove 45, 46, 47, 48. Besides, the circumferential grooves 45, 46, 47, 48 are designed so that the angle of trimming is typically less than 10 or 20°, for example between 1° and 10°.

Here, each of the circumferential grooves 45, 46, 47, 48 is provided with a bottom line BL. Such bottom line BL is comprised in a virtual plane, corresponding to a cut plane CP1, CP2 perpendicular to the central axis Y. Here, the sidewall SW of the multi-cell body is provided with N+1 bottom lines BL. When cutting at the bottom lines BL, N hollow bodies 3, each made of a single cut piece, are directly obtained.

When a pre-container 40 is used to define the hollow body 3, respective cuts may be performed along respective cut planes CP1, CP2 that may be parallel to each other. The trimming equipment 60 or similar cutting means may be configured to cut the pre-container 40 at the bottom line BL of the respective grooves 45, 46, 47, 48 defined in the sidewall SW of the pre-container 40.

A two-sided concentric sealing zone, typically of width 0.5-3 mm as measured in a transverse direction, is formed by trimming the pre-container 40. As a result, a short transverse length Lt is obtained for the top flange 5 and a short transverse length Lb is obtained for the base flange 4, as illustrated in FIG. 1.

Referring to FIGS. 6A, 6B, 6C, it can be seen that the angle of trimming is preferably designed in the range 1-20° or 1-10°, since direction of the corresponding flange 4 or 5 as seen in a longitudinal plane is not too tilted as compared to the corresponding cut plane CP1, CP2 (each cut plane being for instance perpendicular to the central axis Y). Angle a4 thus may be low for the base flange 4 and angle a5 may be low as well for the top flange 5.

Such cut in grooves 45, 46, 47, 48 of generally circular shape or similar regularly rounded shape, which are not provided with high radius of curvature on the outer surface, is of interest since it enables blade access and provides a clean concentric trim. Flanges 4, 5 are obtained with a sufficient change of direction (change of more than 75° as compared to flat angle), as compared to the upper end of the side wall 30. Therefore, each of the flanges 4, 5 offer a full contact surface for the sealing head 50 in a step for sealing the corresponding flexible lid 10, 20, and such arrangement takes into account deformation due to force and temperature.

Figure 17A:
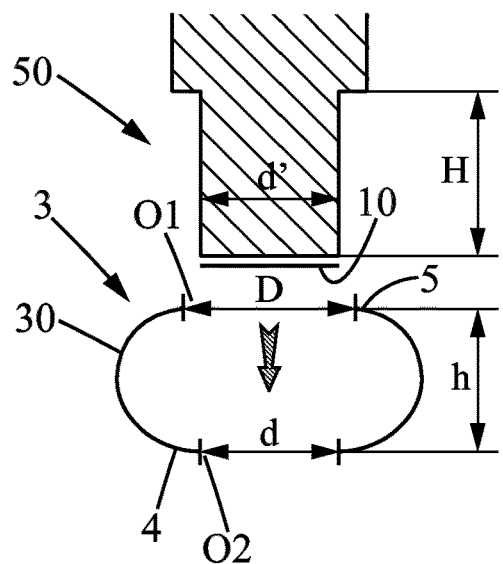
FIG. 17A is a longitudinal section view showing a step of fixing the flexible base lid on an upper face of the base flange.

While the sealing head 50 illustrated in FIG. 17A may be arranged in the longitudinal direction to seal at least the flexible top lid 10, other configurations may be used, for instance with small tilting of the sealing head 50 when the top flange 5 is tilted.

The sealing of at least one of the lids, preferably the two lids 10, 20, may be performed with a variation of pressure values for the contact due to relative movement between the sealing head 50 and the hollow body 3. The sealing of the flexible top lid 20 is obtained with a vacuum leak resistance of at least 0.2 mbar/mm2, preferably from 0.2 to 2.0 mbar/mm$^2$. Similarly, the sealing of the flexible base lid 10 may be obtained with a vacuum leak resistance of at least 0.2 mbar/mm2, preferably from 0.2 to 2.0 mbar/mm$^2$. Such high vacuum leak resistance allow to package contamination sensitive products, such as wet and/or fresh products, preferably wet and/or fresh food products. Powdered dried products are less sensitive, containers comprising such products may not have such high vacuum leak resistance.

Referring to FIG. 6A, it can be seen that a pair of top flanges 5 can be obtained at a specific transverse cut of the pre-container 40. Due to the V-shape longitudinal profile in the sidewall SW of the pre-container 40, without perceptible curved area at junction between the outer faces of the branches of the "V" as viewed in a longitudinal plane, the top flanges 5 obtained after the cut are suitable to define an annular seating area at the upper face 15b thereof. In the illustrated embodiment, the pair of upper faces 15b thus essentially corresponds to the pair of flanks of the circumferential groove defined in an intermediate part of the sidewall SW, also called intermediate circumferential groove 47.

Referring to FIG. 6B, a pair of base flanges 4 can be similarly obtained at a specific transverse cut of the pre-container 40 when cutting at an intermediate circumferential groove 48 (see also FIG. 12, here in the middle of the pre-container 40). The V-shape longitudinal profile in the sidewall SW of the pre-container 40 may be also provided without any curved area at junction between the outer faces of the branches of the "V" as viewed in a longitudinal plane. The pair of lower faces 14a thus essentially corresponds to the pair of flanks of the intermediate circumferential groove 48.

A pre-container top groove 45 and a pre-container bottom groove 46, also defined in the pre-container, as illustrated in FIGS. 11-12 may be used for a trimming operation as well. In such case, only one flange 4, 5, respectively at the top groove 45 and at the bottom groove 46 may be obtained.

In a variant as illustrated in FIG. 6C, it can be seen that an intermediate circumferential groove 47 of the pre-container 40 may be also used to simultaneously define, after the cut:
- a base flange 4; and
- a top flange 5 initially connected to the base flange 4 at a groove bottom line BL, in the sidewall SW of the pre-container 40 before trimming operation.

Referring to FIGS. 6A-6B and 11-12, each of the intermediate circumferential groves 47, 48 have a maximal width D4, D5, D45, measured in a longitudinal direction parallel to the central axis Y. The maximal width D4 and maximal width D5 are preferably lower than corresponding length Lb or Lt. The following relations:

$$H4=D4/2 \; H5=D5/2$$

may be satisfied when the corresponding groove 47, 48 symmetrically extends from either side of the cut plane CP1, CP2.

Similarly, the following relation can be satisfied: a4=b4/2; a5=b5/2 where b4 is the aperture angle defined between the symmetrical flanks of the intermediate circumferential groove 48 (here suitable to define the two base flanges 4), measured in a longitudinal plane.

and where b5 is the aperture angle defined between the symmetrical flanks of the intermediate circumferential groove 47 (here suitable to define the two top flanges 5), measured in a longitudinal plane.

Referring to FIG. 6C, it is understood that the pre-container 40 may also define one or more intermediate circumferential grooves that may form, after the cut to separate two adjacent flanks of the groove, a base flange 4 and a top flange 5, here with a maximal width D45 that corresponds to sum of height H4 and height H5. The aperture angle b45 is also sum of angle 4 and angle a5 in such option. In FIG. 6C, it can be seen that the lower face 14a of the base flange 4 has a greater extension, thus defining a transverse extension length Lb higher than length Lt. Such option may be of interest, for instance in order to have diameters D and d identical, while having a side-wall 30 provided with non-cylindrical parts at least in the opposite ends of the side wall 30.

It is understood that some bodies 3 may be obtained by cutting a pre-container 40 in circumferential grooves 45, 46, 47, 48, while still having a circumferential groove G extending in the side wall 30.

In some options, the circumferential groove G may be of interest to form an additional seat or similar interface for attachment of an additional closure lid 55, flexible, distinct from the base lid 10 and distinct from the top lid 20.

FIG. 18 shows an exemplary variant where the interior volume V may be divided into two compartments C1, C2. In such option, the container 1 is a two-compartment container, in which the body 3 is a thermoplastic hollow body provided with an additional flexible closure lid 55, arranged below the flexible top lid 20, in order to define a lower compartment C1. As illustrated in FIG. 1, such lower compartment C1 extends between the bottom portion defined by the flexible base lid 10 and the additional flexible closure lid 55. The base lid 10, the top lid 20 and the interface closure lid 55 are each sealed in a transverse position, so that the closure lid 55 is an internally sealed lid attached before at least one of the base lid 10 and the top lid 20.

The arrangement with two or more compartments C1, C2 may be obtained using a hollow body 3 defined by at least two adjacent rings R of similar height, after trimming a pre-container 40 such as illustrated in FIGS. 11 and 13. Alternatively, the hollow body 3 of a two compartment container 1 may be obtained using part of the pre-container 40 as shown in FIG. 12. In such case, only one inner shoulder IS may be provided in the side wall 30 of the body 30, at a close distance from one of the base flange 4 and the top flange 5.

The flexible closure lid 55 may be in annular sealing contact with an annular surface 35 formed on an interior face of the side wall 30, between the base flange 4 and the top 31 of the hollow body 3. When sealing the top opening O1 by the flexible top lid 20 that here defines an uncovered top surface S20 of the container 1, an upper compartment C2 is defined between the additional flexible closure lid 55 and the flexible top lid 20.

The annular surface 35 is here defined by an inner shoulder IS that defines a slope. From the outside of the two compartment container 1, it can be seen the circumferential groove G. The compartments C1 and C2 are respectively defined above and below such groove G.

The additional flexible closure lid 55 comprises a central covering portion 55a that defines an upper limit of the lower compartment C1, an annular rim 55b and an annular outer portion 55c that comprises the annular rim 55b. Optionally, the annular outer portion 55c extends upwardly from the central covering portion 55a to the annular rim 55b, while the annular outer portion 55c is in continuous annular contact with the annular surface 35 defined by the inner shoulder. Alternatively or additionally, a tab 56 may be provided as an extension protruding upwardly, for example from the annular rim 55b or directly from the central covering portion 55a. Such tab 56 facilitates pulling of the additional flexible closure lid 55.

In some options, a tongue or similar tab 56 may be used for pulling up and releasing product from one compartment to another.

In order to provide a multi-compartment container 1, it is understood that two or more rings R of an initial pre-container 40 may be used to each define one of the compartments C1, C2. The circumferential groove G between two adjacent rings R thus can be useful to have an interface lid defined by the flexible closure lid 55, internally sealed onto the corresponding inner shoulder IS. Of course, a compartment may be possibly defined by at least two or three adjacent rings R, for example if one of the compartments C1, C2 has to be more elongated.

Optionally, more than one interface closure lid 55 may be used, for example to define two or more compartments C1, C2 in the interior volume V of the container 1.

Now referring to FIGS. 10-17B, some non-limiting examples of making containers 1 are described.

Referring to FIGS. 11 and 13, a plurality of hollow bodies 3 may be obtained from a same plastic piece defining superposed rings R that may directly define the respective hollow bodies 3, after a trimming operation. The pre-container 40 defined by such piece is obtained in a mold that typically contains segments which are repeated along a central axis Y. The mold segments may optionally be longer than wide or such that their length (corresponding to height h of the hollow body 3) is at least more than half a maximal outer dimeter or similar characteristic size measured in a cross section.

Examples of an elongated blow molded pre-container 40 are shown in FIGS. 10, 11, 12 and 13. Identical bodies 3 may optionally be obtained when mold segments are identical so that identical rings R are defined in the pre-container 40.

The pre-container 40, of the kind having a long body defined by the sidewall SW, is obtained by blowing in a mold. It may be may be produced by means of stretch blow molding preforms containing PET or similar polymer plastic material. The method to obtain the pre-container 40 may be an injection blow molding method, for example an injection stretch blow molding method (both being referred to as I(S)BM), or an extrusion blow molding method (EBM). Such method is suitable to produce a pre-container 40 having a first end provided with a single opening 40a (optionally a narrow opening of smaller size as compared to any of the top opening O1 and the base opening O2).

When ejected from the blow molding machine, the elongated pre-container 40 is provided with a bottom section 42 and a section 41 having an open end, such opened section 41 optionally includes a shoulder and a neck. In other words, the pre-container 40 has here a first end having an axial opening, a second end provided with a bottom section 42, at the opposite from the first end, and a multi-cell elongated body 40b comprising the bottom section 42 and a side wall SW of tubular shape. The multi-cell elongated body 40b extends longitudinally between the bottom section 42 and the first end, around the central axis Y. The central axis Y typically defines a longitudinal stretching axis.

A connectable end 43 may be provided at one of the ends, here in the bottom section 42. Such connectable end 43 may form a part easy to be engaged by a driving part and/or guiding elements during handling of the pre-container 40. In particular, the connectable end 43 may have a polygonal cross section (specific and significantly distinct from cross-section in the side-wall SW that may be more rounded). Such polygonal cross section is suitable for driving the pre-container 40 in rotating manner, around the central axis Y, or for maintaining the pre-container 40 when cut by at least one rotating cutting element 63. This kind of bottom section is useful for conveying the pre-container 40 and/or any pretrimmed article defined by a partly cut piece 40' that can be still trimmed to define at least one hollow body 3.

More generally, it is understood that the pre-container 40 may be produced as an optimized intermediary blow-molded piece, ready to be cut thanks to a plurality of circumferential grooves 45, 46, 47, 48 or similar relieves facilitating the cut.

Each of the circumferential grooves 45, 46, 47, 48 are configured with such a depth that a base flange 4 and/or a top flange 5 typically has a radial extension (Lb for the base flange 4, Lt for the top flange 5) superior or equal to 2.0 mm, preferably superior or equal to 2.5 mm, and optionally inferior or equal to 5.0 mm.

The average thickness of the pre-container sidewall SW may be typically inferior to 450 µm, preferably 400 µm, preferably 300 µm, for instance inferior to 260 or 300 µm when produced by means of stretch-blow molding.

Optionally, the preform may also be elongated, in order to obtain a pre-container 40 suitable to produce at least three or four hollow bodies 3 used in different containers 1.

Having an elongated preform may be of interest to have a longitudinal stretching ratio inferior to the radial stretching ratio, which often preferred to optimally reduce amount of plastic material in the sidewall SW.

Regarding the N−1 or more intermediate circumferential grooves 47, 48, defined in the sidewall at a distance from the section 41 and 42, it can be seen that the N−1 or more corresponding bottom lines BL are each defined as an intersection line between:
- a first annular part tapering toward the first end (i.e. toward the section 41), and
- a second annular part tapering toward the second end (i.e. toward the bottom section 42), so that the first annular part and the second annular part define the V-shape longitudinal profile in the sidewall SW.

The V-shape is defined with a determined apex angle also called the aperture angle b4, b5, b45 (see FIGS. 6A-6C), which is typically comprised between 2° and 35 or 40°, preferably between 2 and 20°, as measured in any longitudinal plane parallel to the central axis Y.

The pre-container 40 shown in FIG. 10 illustrates a case where two intermediate circumferential grooves 47 are provided to allow easy cutting in a region separating two hollow bodies 3. Here four grooves 45, 46, 47 are used to obtain two hollow bodies. When using a pair of grooves 47 for each trimming/separation, N hollow bodies 3 may be obtained by performing the cutting in 2N respective grooves formed in the pre-container sidewall SW. More generally, the number of cutting annular areas (at grooves of significant radial extension) may vary, typically between N+1 and 2N.

Here in FIG. 10, the two hollow bodies 3 are separated from each other in the pre-container 40 by a transitory section TS. It is understood that the two circumferential grooves 47 correspond to two opposite axial ends of the transitory section TS. The bottom line BL of each groove 47 is not necessarily arranged in a symmetry median plane of the groove 47. In contrast, a greater angle may be provided on one side, here on the transition section side, which may be of interest for engaging the cutting means 61 in appropriate manner.

Now referring to FIG. 13, it is illustrated a way to cut the blow molded pre-container 40 and then define several containers 1 each having a bottom portion defined by the base lid 10.

The elongated pre-container 40 may be provided with intermediate circumferential grooves 47, 48 that extend at a different distance from the central axis Y, and which may be arranged in alternation along the longitudinal direction of the pre-container 40, as shown in FIG. 13 for instance.

In such case, the trimming equipment 60 may be provided with cutting elements 63, for example with straight blades or concave blades, that are more or less distant from the central axis Y, depending on location of the bottom lines defined in the respective circumferential grooves 45, 46, 47, 48. In FIG. 13, a simultaneous trimming may be performed, by using a first group of cutting elements 63 having a same proximal position, at a first radial distance, with respect to the central axis Y and a second group of cutting elements 63 having a distal position, at a second radial distance longer than the first radial distance, with respect to the central axis Y. More generally, it is understood that, if diameter or size D is greater than diameter or size d or if there exists a dimensional difference d-D, the parallel trimming blades are offset in the arrangement of cutting elements 63 (typically into two lines), in order to accommodate the difference.

In such trimming operation, the opened section 41 of the pre-container 40 is cut away from the elongated body of the pre-container 40, while the bottom section 42 is severed from a lower end of the sidewall SW of the pre-container 40. Typically, the opened section 41 and the bottom section 42 are internally recycled (which means zero industrial scrap).

In some options, the bottom section 42 may be directly retrieved to form another kind of container, for example a container having a single top opening. Besides, the opened section 41 may also be retrieved to form a bottle, possibly a bottle to be mounted on sub-recipient, the lower opening of the opened section 41 being a wide mixing port or being covered by a rigid bottom cap.

When trimming the elongated pre-container 40, a plurality of hollow bodies 3 are obtained. Here in the example of FIG. 13, some of the hollow bodies 3 are obtained in inverted position. When having one or more transitory sections TS, the hollow bodies 3 may optionally have same orientation (non-inverted position).

Referring to FIGS. 10-11 and FIGS. 6A-6B, it is understood that at least two identical hollow bodies 3 may be obtained after the cut along the respective cut planes CP1, CP2. The grooves 45, 46 have a flank designed to define the base flange 4, here delimiting a base opening O2 of lower size d as compared to the diameter D of wide top opening O1.

Referring to FIG. 12, four identical hollow bodies 3 are obtained after the cut along the respective cut planes. The grooves 45, 46 have a flank designed to define the base flange 4, while the mid-groove 48 has a V-shape defined by two flanks that also each define the base flange 4. The base opening O2 is of lower size d as compared to the diameter D of wide top opening O1. Optionally, an inner shoulder IS offers a seating area for an additional closure lid, so as to create a partition between two compartments.

Such embodiments show circumferential grooves 45, 46, 47, 48 each suitable to define a transverse cut planes CP1 or CP2, thus providing an inwardly turned flange 4 or 5. But a container such as illustrated in FIG. 7 may be obtained, for instance using an extrusion blow molding line. A container 1 provided with a top flange 5 that protrudes radially outwards may be obtained if there is a protruding relief on the outer face of the sidewall SW of the pre-container 40.

Of course, any kind of separator may be used to separate the hollow bodies 3. The trimming equipment 60 that provides such separation function may optionally be stationary and rapidly slice through the pre-container body with a rough cut, like a guillotine, or it may move periodically move along with the pre-container body during separation. The separator or trimming equipment 60 may be mechanical or may involve laser cutting. When a mechanical separator is used, rough cut may be typically performed in a heated state (for example 65° C.).

While the cut is here called "rough cut", there is typically non need for an additional precision trimming step or other additional cut. This is advantageously obtained by the design of the grooves 45, 46, 47, 48 and/or the kind of blade used in the cutting elements 63. Multi-trimming operation may be preferred to accelerate the trimming operation.

The pre-container 40 may optionally be trimmed along multiple parallel trimming lines of the trimming equipment 60, by a relative rotary motion between each pre-container 40 and the blades or similar cutting elements 63. This option is schematically illustrated by FIG. 13. Here, the parallel cutting elements 63 are offset in alternation, in order to accommodate the difference between the grooves 47 and the grooves 48. Indeed, the pre-container 40 may be provided with respective inverted orientation between the respective rings R (forming the bodies 3) of the sidewall SW, diameter D being here greater than diameter d. More generally, any configuration of the cutting elements 63 may be use to accommodate any variation in the cutting diameters.

Alternatively or additionally, all or part of the pre-container 40 may be trimmed along multiple parallel trimming lines concurrently being retained and rotated by the opened end 41 (for instance at a neck thereof) and stabilized by other touch points on the elongated body of the pre-container 40.

Figure 15:
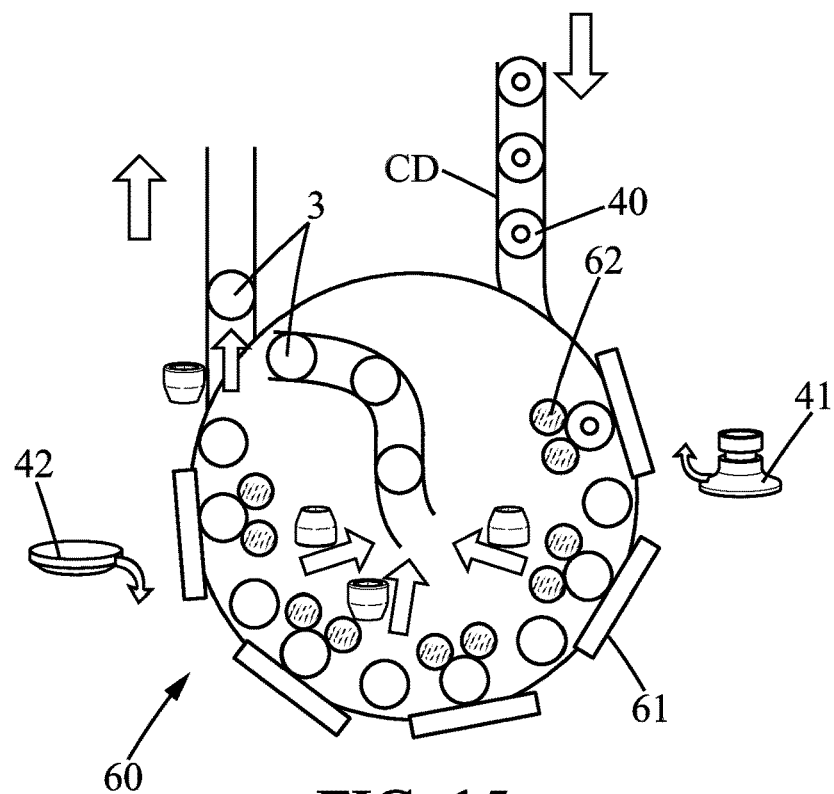
FIG. 15 schematically illustrates trimming equipment adapted to obtain hollow bodies from elongated pre-containers.

In other options, the pre-container 40 is cut along multiple parallel trimming lines sequentially being retained & rotated, by ate last one of the opened section 41 and the bottom section 42, and stabilized by other touch points on the elongated body of the pre-container 40. FIGS. 15-16 illustrate schematically such sequential trimming.

Referring to FIG. 15, the elongated pre-containers 40 may be displaced by a conveyor device CD, in order to have high rate of production. The conveyor device CD may be a conveyor device having opposed parallel faces and/or guiding rollers adapted frictionally to engage, hold and drive the vertical sides of a pre-container without substantial distortion. The conveyor device CD may be mounted on a main frame. Here, the conveyor device CD is provided with guiding members that may rotate and adapted to control position of the pre-container 40.

Referring to FIG. 13, a simultaneous trimming is optionally performed by using cutting means 61 having cutting elements 63 (each with a cutting edge) defined at different levels along an axis parallel to a longitudinal axis Y of the pre-container 40. Such cutting means 61 may be mounted in a carousel structure, allowing a circular cut or similar cut on circumference of the pre-container 40. The cutting means 61 are optionally provided in the pathway of the pre-containers 40 during transportation by a conveyor device or the like. Here the pre-containers 40 are immobilized during the trimming operation.

The rotation axis, allowing a 360° movement of the cutting elements 63 is parallel to the longitudinal axis Y of the pre-containers 40 that are typically maintained in a stationary position by anti-rotation guiding element, until the cutting elements 63 reach the initial position. Then the guiding elements, which are movable, are unlocked and selectively disengaged by displacement toward a retracted position. When the following pre-container 40 is received in the working area, the guiding elements are moved to a lock position with respect to the pre-container 40 and the rotatable cutting means 61 can be driven to perform the trimming operation.

Now referring to FIG. 15, it can be seen that the pre-containers 40 may optionally be trimmed without moving the cutting elements 63. In such example, the guiding members may be a set of rollers 62. Cutting means 61 are provided in the pathway of the pre-containers 40 during transportation by the conveyor device CD. The cutting means 61 may be defined by a plurality of pre-container trim devices, each having a fixed cutting system featuring pre-container rotation and carousel orbital movement. The movement of the pre-container 40 by conveyor means, here the rollers 62, against the cutting means 61 causes the pre-container 40 to be cut into two or more sections, including the rings R.

For example, opposing finger elements having respective cutting edges may engage the sidewalls SW of the elongated pre-containers 40, in the region of the grooves 45, 46, 47, 48. As illustrated in FIG. 16, a stationary knife or similar cutting element 63, optionally curved, may be attached to a blade holder 64 and a set of rollers 62 may be associated with each stationary knife.

As the rollers 62 and the blade holder 64 are especially adapted to guide a part of the pre-containers 40 where a groove 45, 46, 47, 48 is defined, such part may be gripped, for example at three points (two points defined by the rollers and the other point defined on the stationary knife side), eliminating the risk of any unwanted movement of the pre-container 40 during the trimming operation. Such configuration is of interest to obtain efficient cut and allowing use of the flanges 4, 5 as sealing surfaces.

Here in the example of FIG. 15, except for an initial trimming of the pre-container 40 where the opened section 41 is severed (possibly a section 41 provided with a blow dome), a body 3 may be retrieved after each cutting step and guided toward an exit of the trimming equipment 60, so that all the bodies 3 are directly transported on a downstream part of the process, typically on a conveyor device. Here, during a final trimming of the lower part of the pre-container 40, the bottom section 42 is severed from the last body 3.

At each end of the hollow body 3, a circumferential flange 4, 5 extending inwardly from the corresponding end of the side wall 30 is defined. This is due to the fact that the cutting element 63 is inserted through the pre-container sidewall SW at the bottom line BL of respective grooves 45, 46, 47, 48, as shown in FIGS. 13 and 16.

The rotation of the elongated pre-container 40 (or partly cut piece 40') along the cutting element 61, here a knife having a slightly curved cutting edge, may optionally be limited to the diameter or circumference required for fully cutting the plastic material at a bottom line BL of the groove 45, 45, 47, 48, which prevents the generation of chips or plastic particles.

The cutting element 61 may be a non-heated cold knife, possibly with a re-sharpenable blade. Of course, the trimming operation may be implemented in various manners. It is understood that such trimming operation is of interest to prepare in a Step A) a plurality of one-piece hollow bodies 3, at a high rate of production.

In illustrated embodiments, the flanges 4, 5 in the hollow bodies 3 have each a radial extension Lb, Lt comprised between 2.0 mm and 5.0 mm, measured between the annular inner rim and the annular outer rim (outer rim adjacent to the corresponding annular axial end of the body side wall 30). Referring to FIGS. 4A, 4B and 4C, the top flange 5 is tapering upwardly at least before the sealing of the flexible top lid 20, so as to define a slope angle a5 (see FIGS. 6A and 6C) between 5° and 20°, preferably between 10° and 20° to a plane perpendicular to the longitudinal axis (X), here at a ring portion 22 that can be used for attachment of the flexible top lid 20. Referring to FIG. 4D, only a first flange portion FP1 of the top flange 5 may be provided with such angle a5 before the sealing, a second flange portion FP2 (that can be included in the ring portion 22) being less angled or substantially horizontal when the annular inner edge 5b extends horizontally. Such radial extension and such angled configuration are of interest for the hermetical sealing of the flexible top lid 20 (with suitable vacuum leak resistance). The base flange 4 may be configured either similarly, by tapering downwardly before the sealing (for example to be sealed at the lower face 14a), or in a different manner.

Referring to FIGS. 13-14 and 17A-17B, such Step A) may be followed by a Step B) of sealing the flexible base lid 10, which allows the base opening O2 to be closed in tight manner. The base lid 10 is placed in annular contact with the base flange 4 and a heat sealing may be performed to complete such Step B). Then a Step C) of filling the interior volume V, defined by the side wall 30 and the flexible base lid 10, with content C3, is performed using the available wide top opening O1. Having a wide opening of more than 30, 35 or 40 mm is of interest to accelerate Step C). Preferably, the content C3 is a composition, preferably a food composition, that is flowable, at least when performing Step C). The content C3 may be still flowable, for example under a liquid or semi-liquid form when the final consumer open the top lid 20.

Figure 17B:
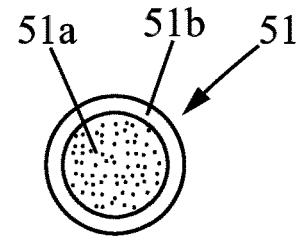
FIG. 17B is a bottom view of a sealing head used to perform the kind of fixation shown in FIG. 17A.

Step B), essentially consisting of sealing the flexible base lid 10, may be performed as illustrated in FIGS. 17A-17B, in order to entirely close the base opening O2. The diameter or outer size d' of the sealing head 50 may be of suitable size and shape, so as to be inserted through the top opening O1. The outer size d' is thus inferior to the diameter D. The flexible base lid 10 may be maintained in contact with a substantially planar front face 51 of the sealing head (or the front face 51 being planar at least in the annular area used for the sealing). Here, the flexible base lid is internally sealed.

The flexible top lid 20, made of a thin film or layered material (typically foil material), does not increase the bulk of the container and does not reduce the interior volume to be filled with container content. The same may apply for the flexible base lid 10, also made of a thin film or layered material (typically foil material).

Referring to FIG. 17B, the sealing head 50 may be provided with a front face 51 having a central portion 51a provided with vacuum apertures and an annular portion 51b adapted to transmit heat to the base flange 4 and to the crown-shaped or disc-shaped margin portion 10b of the flexible base lid 10. The sealing head 50 provides a vacuum to pick & release the base lid 10, and a heating ring to activate the sealing. A similar sealing head 50 or a similar sealing unit having same kind of front face 51 may be used to seal the flexible top lid 20, in a step D) which follows the step C). Referring to FIG. 17A, the heat ring in the sealing head 50 is here designed to operate at a diameter d' that is lower than diameter of the top opening O1. It is typically done by the sealing head 50 entering linearly, for instance vertically, into the hollow body 3 from the opposite orifice defined by the top opening O1. The front face 51 is thus facing the upper face 14b of the base flange 4.

FIGS. 3B, 17A-17B illustrate each an option of fixing the flexible base lid 10 on an upper face 14b of the base flange 4. The flexible base lid 10 may be held by a sealing head 50 that is moved to the interior volume V, in order to push the flexible base lid and heat-seal the disc-shaped margin portion 10b onto the upper face 14b. Height H of the insertable part of the sealing head 50 may be superior to height h of the hollow body 3. When having an interface closure lid 55 to be sealed on an inner shoulder IS, in order to seal a lower compartment C1 of a multi-compartment container 1, a same kind of sealing head 50 may be used.

But in a variant, the heat ring in the sealing head 50 may be designed, for instance by use of folding flaps; to operate at a diameter d' wider than the entry dimension of the sealing head 50 into the top opening O1. As the base lid 10 is flexible, it remains quite easy to introduce such base lid through the top opening O1 even if the diameter d is greater than diameter D.

In some variants, the flexible lids 10 and 20 are each externally sealed.

Figure 14:
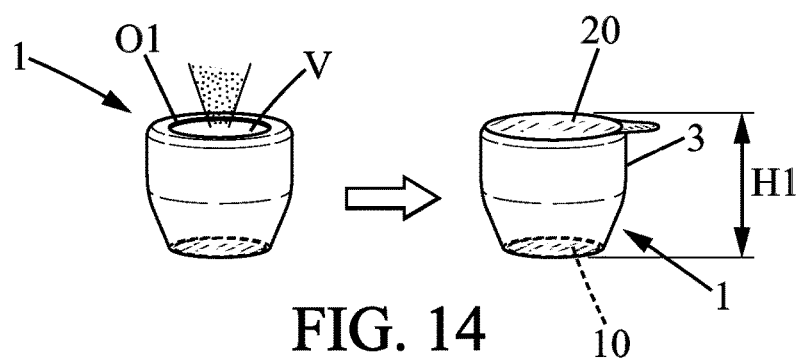
FIG. 14 shows exemplary final steps to define a filled and sealed container in accordance with a second embodiment of the invention.

Step D), essentially consisting of sealing the flexible top lid 20, may be performed as illustrated in FIG. 14, using a sealing head 50 such as illustrated in FIGS. 17A-17B, in order to entirely close the top opening O1.

The sealing of the lid 10 or 20, may be performed by applying the sealing head 50 at a temperature that may be maintained at a temperature level comprised between 140° C. and 200° C. The sealing can be divided into at least two sealing sub-steps, preferably from two to four sealing sub-steps. For instance, in order to seal the lid 10, 20 onto the corresponding face (face 15b of the top flange 5 for the top lid 20), a pushing action from the sealing head 50 may be repeated, with two, three, four or five repetitions.

Each time, pressure is released and the top flange 5, respectively the base flange 4, may oscillate between a pressed state and a release state (which optionally corresponds to a state with a lower pressure from the sealing head).

Due to the heat treatment and deformation pressure, the slope formed by the top flange 5 is decreased. For instance the angle a5 of about 15°+/−5° (illustrated in FIG. 4D) is converted into a final angle a5' of about 4°+/−3° (illustrated in FIG. 2). In the illustrated embodiment of FIGS. 2 and 4D, the base flange 4 and the top flange 5 are typically made of PET, preferably semi-crystalline PET.

In preferred embodiments, the sealing is performed by at least two pushing actions from the sealing head 50. When the sealing of the flexible lid involves PET material at the ring portion 22, it is typically performed with a variation of pressure values for the contact. This is due to relative movement between the sealing head 50 and the hollow body 3. Hinge effect at hinge area Z3 (illustrated in FIG. 2 for the top flange) is of interest to keep perfect integrity of the body 3, here a PET body. Similar or identical hinge effect may be provided adjacent to or at outer annular rim of the base flange 4.

The slope angle a4 and the slope angle a5 (formed in unsealed state of the respective flanges 4, 5) is typically decreased (progressively) in this manner. FIG. 2 shows the lower angle value a5' corresponding to the final angle in sealed state.

The top flange 5 has here a maximum thickness, which is typically located in region of the ring portion 22 provided with flat surface portion, for contact with the sealing head 50. The maximum thickness is preferably at least 400 μm and may be higher than an average thickness e of the side wall 30, preferably at least 100 μm higher.

In preferred embodiments, the flexible top lid 20 is sized and shaped so that only one pull tab PT of the lid is laterally shifted away from the active face of the sealing head 50. As a result, the pull tab PT is not adhered to the body 3 and radially protrudes outward to be laterally shifted relative to the annular top 31 of the side wall 30.

After the sealing, the annular outer rim 20b of the flexible lid 20 may extend not beyond 1 mm (except in region of the pull tab PT) from the outer rim 5a of the top flange 5 having the final slope as illustrated in FIG. 2 (the slope being here provided with an angle a5' defined between the lower face 15a of the top flange 5 and a horizontal plane; the angle a5' is of about 5° in non-limitative example of FIG. 2 but could be lower or slightly higher).

The top flange 5, as obtained after the sealing, may be provided with a low radius of curvature RC' in the region adjacent to the top 31 of the annular side wall 30. The radius of curvature RC' may be lower than 2 mm and is here slightly lower than the corresponding radius of curvature RC before sealing (illustrated in FIG. 4D). Optionally at the outer rim 5a, the radius of curvature RC of the container outer face may be comprised between 1 and 2 mm, for example about 1.5 mm. Such radius of curvature is measured in a plane parallel to the longitudinal axis X and intersected by the longitudinal axis X.

While the sealing head 50 illustrated in FIG. 17A may be arranged in the longitudinal direction to seal at least the flexible top lid 10, other configurations may be used, for instance with small tilting of the sealing head 50 when the top flange 5 is tilted. Besides, the top flange 5 can optionally be tilted (at a small angle relative to the horizontal plane) in some variants.

Regarding step C), it is understood that a single filling may be performed if the hollow body 3 defines a single compartment. Alternatively, a sequential filling and sealing by an inner lid defining the interface closure lid 55, may be performed if the hollow body 3 defines two superposed compartments C1, C2. Typically, sealing may be less strong for the interface closure lid 55 than for the flexible base lid 10.

In some options, the top lid 20 may be automatically and selectively folded on itself due to an actuation, for example a pushing action exerted radially inward close to the lower end of the body side wall 30.

Referring to FIGS. 19A and 19B, the hollow body 3 may be provided with bistable panels BP that may be of interest for logistics efficiency, in particular better filing of trays and/or pallets for transportation. Such bistable panels BP may be provided in a rounded or bulged part of the side wall 30 having the greater cross-section, for instance at an axial distance from the base 32 when a lower portion 302 of the side wall 30 is tapering downwardly.

Due to the bistable panels BP or similar radially pushable areas, a more squared cross section may be obtained when the containers 1 are stored for transportation or other logistics requirements. FIG. 19B illustrates a back position for a pushed panel PP in a maximally pushed state. For instance, if the containers 1 are arranged in rows, the interspace between two containers 1 of the same row may be reduced. A number of two, three of four bistable panels BP may be preferably used.

Now referring to FIG. 20, the hollow body 3 may be provided with at least one folding line FL or similar area, partly or continuously extending in the side wall 30. Such folding line FL may be obtained by a line of weakness or similar line where a thinned zone of plastic material is defined. As a result, after full consumption of the content, the body 3 is easily foldable for disposal and recycling. A crushed body 330 having a generally C-shape cross-section, so that the body 330 is possibly flattened, may be obtained.

The ring-like shape of the hollow body 3 makes side wall 30 suitable to be folded after use, preferably after entirely removing the top lid 20 and the base lid that may be in other material than the plastic material of the body 3. The folding may occur due to reduced size for the length Lb of the top flange 5 and reduced similar transversal size of the base flange 4 (typically less than 3 or 5 mm, while being superior or equal to about 0.5 or 1 mm).

In some options, the side wall 30 may be designed to fold into itself along a line or plane of symmetry. Two opposite folding lines FL are optionally provided for that purpose. Of course, the folding action may be facilitated by the shape and material distribution in the side wall 30 and optionally in at least one of the flanges 4, 5. For example, the folding action is facilitated by specifically designed ribs of the side wall 30 that may extend parallel or in same general direction, defining each a folding line FL. A hinge effect may be obtained at each of the folding lines FL. Ribs may be defined during a molding process, for example when forming the pre-container 40 in options where the hollow bodies 3 are obtained from a larger size, elongated, pre-container 40.

Etching or at least one precut may also be used to define ribs or folding lines. More generally, it is understood that the hollow body 3 may be provided with any suitable means for initiating a folding action along a folding line FL, typically a longitudinal folding line. Preferably, the folding is also obtained by using weakness areas in the respective flanges 4, 5, such areas being designed as axial extensions of a corresponding folding area defined in the side wall 30.

The containers 1 may be grouped in a food pack. For example, a wrapping element made of cardboard or plastic may be used for packing the containers 1 in two rows. The wrapping element, such as disclosed in document EP 0461947, may define a top panel, a bottom panel and at least two side panels. Spacing elements, for example a beam member or folded members, may be optionally provided to maintain the containers in parallel rows.

More generally, such food pack may be provided with at least one row of containers. In some options, an additional covering element may be used to protect the bottom portion of the containers 1, thus covering the flexible base lid 10. The covering element may be used to group at least two containers, for example by defining respective cavities for receiving with a small play the lower parts of the containers 1.

The container 1 can be for example a container having a capacity of, or containing a content of a volume of (or mass of) of 50 ml (or 50 g), to 1 L (or 1 kg), for example a container of 50 ml (or 50 g) to 80 ml (or 80 g), or 80 ml (or 80 g) to 100 ml (or 100 g), or 100 ml (or 100 g) to 125 ml (or 125 g), or 125 ml (or 125 g) to 150 ml (or 150 g), or 150 ml (or 150 g) to 200 ml (or 200 g), or 200 ml (or 200 g) to 250 ml (or 250 g) or 250 ml (or 250 g) to 300 ml (or 300 g), or 300 ml (or 300 g) to 500 ml (or 500 g), or 500 ml (or 500 g) to 750 ml (or 750 g), or 750 ml (or 750 g) to 1 L (or 1 kg).

The container 1 can be used for product comprising the container and a content in the container. Thus at least a part of an interior volume V of the container is filled with a content. The container can be a packaging element of the content, useful to transport, protect, preserve, and/or otherwise procure said content.

The content can be any kind of content to be procured to a user, for example a consumer, in moderate quantities. The content can for example a food or beverage composition, a drug, a personal-care composition, a home-care composition, a home improvement composition, a toy, a small part good.

Examples of personal care compositions include hair care compositions such as shampoo compositions, conditioner compositions or hair coloring compositions, skin compositions such soap compositions, body wash compositions, sun protection compositions, hydrating compositions or anti-aging compositions, and make-up compositions.

Examples of home-care compositions include, fabric care compositions such as laundry compositions or softener compositions, dish-washing compositions such as manual dish washing compositions or automatic dish washing compositions, hard-surface cleaning compositions, such as kitchen cleaning compositions, bathroom cleaning compositions, wood floor cleaning compositions or tiles cleaning compositions.

Examples of home improvement compositions include paints, glues, plasters or cements compositions.

Examples of small parts goods include nails, screws and the like.

Food or beverages are compositions that are to be orally consumed. This can be in various forms including liquid, viscous semi-fluid, or solid, optionally as a powder. The food can be a spoonable viscous semi fluid composition or spoonable solid. It can be for example or scoopable solid, as opposed to a spoonable powder.

The beverage can be water, carbonated or non-carbonated, non-alcoholic beverages (also referred to as soft drinks), carbonated or non-carbonated, alcoholic beverages, carbonated or non-carbonated, milk or vegetal milk substitutes.

The food can be cereals, dairy compositions, vegetal dairy substitute compositions, deserts compositions such as creams, mousses, gels, puddings, ice-creams compositions, fruits, vegetables, or fruit or vegetables compositions for example whole fruits or whole fruit parts, fruit purees or jams, meat of meat substitutes, confectionary compositions, sauces compositions, soups compositions, infant nutrition compositions, medical nutrition compositions, coffee creaming or whitening compositions, coffee or chocolate compositions, for example instant coffee or chocolate, or other grocery compositions.

The food can be a frozen composition, chilled or fresh, typically with a storage at a temperature of from 0° C. to 10° C., or long shelf ambient temperature food, typically with a storage at a temperature of higher than 15° C.

In some embodiments the food is a wet food compositions, comprising substantial amounts of moisture or water, as opposed to dehydrated food compositions, for example at least 20% by weight, or at least 30% by weight, or at least 40% by weight, or at least 50% by weight, or at least 60% by weight, at least 80% by weight. Such compositions can be more sensitive to contaminations and a high resistance sealing, for example with a high vacuum leak resistance can be appropriate.

Dairy compositions or vegetal dairy substitute compositions typically comprise of dairy material or a dairy substitute material. Herein, unless otherwise provided "dairy" or "milk" can encompass vegetal substitutes, for example based on soy, oats, almond, rice, coconut and mixture thereof.

The dairy composition can be for example a dessert, a fermented dairy composition such as yogurt or kefir, a cheese, butter.

The dairy material is typically comprised of milk and/or ingredients obtained from milk. It is also referred to as a "milk-based composition". Herein milk encompasses animal milk, such as cow's milk, and also substitutes to animal milk, such as vegetal milk, such as soy milk, rice milk, coconut milk, almond milk, oats milk etc. . . .

Dairy compositions are known by the one skilled in the art of dairy products, preferably of fermented dairy products. Herein a milk-based composition encompasses a composition with milk or milk fractions, and compositions obtained by mixing several previously separated milk fractions. Some water or some additives can be added to said milk, milk fractions and mixtures. Preferably the milk is animal milk, for example cow's milk. Some alternative animal milks can be used, such as sheep milk or goat milk.

The milk-based composition can typically comprise ingredients selected from the group consisting of milk, half skimmed milk, skimmed milk, milk powder, skimmed milk powder, milk concentrate, skim milk concentrate, milk proteins, cream, buttermilk and mixtures thereof. Some water or additives can be mixed therewith. Examples of additives that can be added include sugar, sweeteners, fibers, and texture modifiers.

Fermented dairy compositions typically comprise bacteria, preferably lactic acid bacteria, preferably alive. Appropriate bacteria for fermentation are known by the one skilled in the art. It is mentioned that lactic acid bacteria are often referred to as ferments or cultures or starters. The lactic acid bacteria preferably comprise, preferably essentially consist of, preferably consist of, *Lactobacillus delbrueckii* ssp. *bulgaricus* (i.e. *Lactobacillus bulgaricus*) and *Streptococcus salivarius* ssp. *thermophilus* i.e. (*Streptococcus thermophilus*) bacteria. The lactic acid bacteria used in the invention typically comprise an association of *Streptococcus thermophilus* and *Lactobacillus bulgaricus* bacteria. This association is known and often referred to as a yogurt symbiosis.

Fermented dairy compositions are typically obtained by a process involving a fermentation step with at least one lactic acid bacteria. In this step the dairy material is inoculated with the lactic acid bacteria, and the mixture is then allowed to ferment at a fermentation temperature. Such inoculation and fermentation operations are known by the one skilled in the art. During fermentation, the lactic acid bacteria produce lactic acid and thus cause a pH decrease. With the pH decreasing proteins coagulate to form a curd, typically at a breaking pH. The fermentation temperature can be of from 30° C. to 45° C., preferably from 35° C. to 40° C., with a pH decrease to a breaking pH at which proteins coagulate to form a curd. The breaking pH is preferably of from 3.50 to 5.50, preferably of from 4.0 to 5.0, preferably from higher than 4.5 to 5.0.

The present invention has been described in connection with the preferred embodiments. These embodiments, however, are merely for example and the invention is not restricted thereto. For instance, the flanges 4, 5 used for the containers 1 shown in FIGS. 1 and 3A-3B are not necessarily provided with circular edges. Other shapes, including straight edge portions may be used. Besides, the side wall 30 does not necessarily always extend regularly around a longitudinal axis X, here illustrated as a symmetry axis. Of course, the side wall 30 may be provided with a longitudinal irregular profile and/or significant curves, possibly with at least one oblique gripping part or oblique shoulder.

It will be understood by those skilled in the art that other variations and modifications can easily be made within the scope of the invention as defined by the appended claims, thus it is only intended that the present invention be limited by the following claims.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A method to produce a plurality N of hollow bodies, N being a natural number greater than or equal to 2, the method comprising the following steps:
   forming by blowing plastic material a pre-container extending along a central axis, so as to define an opened pre-container section and a hollow body section defining a pre-container sidewall that extends around the central axis, the pre-container sidewall (SW) being provided with a plurality of circumferential grooves each with a bottom line formed in a virtual plane perpendicular to the central axis, and
   cutting the pre-container to sever the opened pre-container section and a bottom section of the pre-container, the cutting being performed transversally to the central axis, at several of the respective circumferential grooves, to form a top opening and a base opening of N respective hollow bodies, each of the top opening and the base opening being delimited by an annular inner rim of a body flange,
   wherein the cutting of the pre-container is performed by simultaneously cutting the opened pre-container section and the bottom section.

2. A method to produce a plurality N of hollow bodies, N being a natural number greater than or equal to 2, the method comprising the following steps:
   forming by blowing plastic material a pre-container extending along a central axis, so as to define an opened pre-container section and a hollow body section defining a pre-container sidewall that extends around the central axis, the pre-container sidewall (SW) being provided with a plurality of circumferential grooves each with a bottom line formed in a virtual plane perpendicular to the central axis, and
   cutting the pre-container to sever the opened pre-container section and a bottom section of the pre-container, the cutting being performed transversally to the central axis, at several of the respective circumferential grooves, to form a top opening and a base opening of N respective hollow bodies, each of the top opening and the base opening being delimited by an annular inner rim of a body flange,
   wherein the method further comprises, for one of the hollow bodies, which is provided with two body flanges:
   after forming the two body flanges under the form of a top flange around the top opening and a base flange around the base opening, sealing a flexible lid made of foil material onto at least one of the two body flanges.

3. The method of claim 2, wherein the pre-container is formed by blow molding a single piece of plastic material, which is a hollow preform.

4. The method of claim 2, wherein the pre-container is heated and shaped in a mold device that comprises inner ribs, so as to form said plurality of circumferential grooves, wherein the bottom section is a closed bottom section and the elongated pre-container being provided with a section having an open end when ejected from the mold device, with the section having an open end forming a single opening of the pre-container.

5. The method of claim 2, wherein the cutting of the pre-container is performed so as to form at least two hollow bodies of same height, due to a same spacing between respective pairs of the circumferential grooves.

6. The method of claim 2, wherein the cutting of the pre-container is performed by sequentially cutting the opened pre-container section and the bottom section.

7. The method of claim 2, wherein the cutting of the pre-container comprises cutting at one of the circumferential grooves to separate two adjacent hollow bodies having an opening identical in size and shape.

8. The method of claim 2, wherein amongst the hollow bodies, two hollow bodies are separated from each other in the pre-container by a transitory section, wherein the cutting of the pre-container comprises cutting at two of the circumferential grooves that correspond to two opposite axial ends of the transitory section.

9. The method of claim 8, wherein the transitory section is at least twice shorter, as measured along the central axis, than any one of the N hollow bodies.

10. The method of claim 9, wherein each of the hollow bodies has a height greater than 40 mm, the transitory section having a height no longer than 25 mm.

11. The method of claim 3, wherein the pre-container is heated and shaped in a mold device that comprises inner ribs, so as to form said plurality of circumferential grooves.

12. The method of claim 3, wherein the cutting of the pre-container is performed so as to form at least two hollow bodies of same height, due to a same spacing between respective pairs of the circumferential grooves.

13. The method of claim 4, wherein the cutting of the pre-container is performed so as to form at least two hollow bodies of same height, due to a same spacing between respective pairs of the circumferential grooves.

14. The method of claim 2, wherein the cutting of the pre-container is performed by simultaneously cutting the opened pre-container section and the bottom section.

15. The method of claim 2, further comprising recycling the opened pre-container section and the bottom section that is closed, in a stream of plastic material.

16. An elongated blow-molded pre-container made of a single piece of plastic, provided with a plurality N of hollow bodies, N being a natural number greater than or equal to 2, the pre-container comprising:
a first end provided with an opening;
a second end provided with a bottom section, at the opposite from the first end;
a multi-cell body, which is elongated, comprising the bottom section and a pre-container sidewall of tubular shape that longitudinally extends between the bottom section and the first end, around a central axis;
wherein the pre-container sidewall of the multi-cell body comprises a determined number equal to at least N+1 of circumferential grooves each provided with a bottom line defined in a virtual plane perpendicular to the central axis;
wherein N−1 of the bottom lines form each an intersection line between:
a first annular part tapering toward the first end, and
a second annular part tapering toward the second end, so that the first annular part and the second annular part define a V-shape longitudinal profile in the pre-container sidewall, the V-shape being defined with a determined apex angle, which is comprised between 10° and 40°, as measured in any longitudinal plane parallel to the central axis,
wherein the pre-container sidewall forms a plurality of hollow bodies each having a body side wall extending between two determined grooves of the circumferential grooves, each bottom line of the two determined grooves being adapted to delimit a body opening when cut perpendicular to the central axis, whereby each body opening is delimited by an annular inner rim of a body flange, and
wherein the determined number of circumferential grooves is equal to N+1.

17. The pre-container according to claim 16, wherein the two determined grooves used to form a body opening form:
a first bottom line radially offset, inwardly by a radial distance superior or equal to 2.0 mm, from a first axial annular end of the body side wall;
a second bottom line radially offset, inwardly by a radial distance superior or equal to 2.0 mm, from a second axial annular end of the body side wall, the second axial annular end being provided at the opposite from the first axial annular end.

18. The pre-container according to claim 16, wherein the pre-container sidewall is configured to provide, in a given body, opposite body openings of different size.

19. The pre-container according to claim 16, wherein each of the bottom lines has a circular section and is of greater size than the opening of the pre-container, which is a narrow opening.

* * * * *